(12) United States Patent
Takase et al.

(10) Patent No.: US 8,019,202 B2
(45) Date of Patent: Sep. 13, 2011

(54) CONTENT REPRODUCTION APPRATUS, CONTENT REPRODUCTION METHOD, AND CONTENT REPRODUCTION SYSTEM WITH VARIED-SPEED REPRODUCTION REQUESTS

(75) Inventors: Tsunemitsu Takase, Tokyo (JP); Yoshikatsu Niwa, Kanagawa (JP); Shinya Masunaga, Tokyo (JP); Tomoaki Takemura, Tokyo (JP); Junichi Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 12/204,784

(22) Filed: Sep. 4, 2008

(65) Prior Publication Data

US 2009/0070499 A1    Mar. 12, 2009

(30) Foreign Application Priority Data

Sep. 6, 2007    (JP) .................. 2007-231520

(51) Int. Cl.
  *H04N 5/783* (2006.01)
  *G06F 3/00* (2006.01)
(52) U.S. Cl. ........ 386/350; 386/206; 386/343; 386/344; 710/52; 710/57; 710/60
(58) Field of Classification Search .................. 386/350
  See application file for complete search history.

(56) References Cited

U.S. PATENT DOCUMENTS

| | | | | |
|---|---|---|---|---|
| 5,546,244 A | * | 8/1996 | Park et al. ........................ | 360/53 |
| 5,606,422 A | * | 2/1997 | Yanagihara et al. .............. | 386/1 |
| 5,740,307 A | * | 4/1998 | Lane ................................ | 386/68 |
| 5,923,812 A | * | 7/1999 | Sakazaki et al. ............... | 386/326 |
| 5,933,567 A | * | 8/1999 | Lane et al. ..................... | 386/200 |
| 5,937,138 A | * | 8/1999 | Fukuda et al. ................. | 386/112 |
| 6,018,611 A | * | 1/2000 | Nogami et al. .................. | 386/52 |
| 6,064,794 A | * | 5/2000 | McLaren et al. .............. | 386/343 |
| 6,151,634 A | * | 11/2000 | Glaser et al. .................. | 709/236 |

(Continued)

FOREIGN PATENT DOCUMENTS

EP    0 727 911    8/1996

(Continued)

OTHER PUBLICATIONS

Extended European Search Report dated Sep. 10, 2010, for corresponding EP application No. 08252958 (5 pages).

*Primary Examiner* — Henry W Tsai
*Assistant Examiner* — Steven Snyder
(74) *Attorney, Agent, or Firm* — Finnegan, Henderson, Farabow, Garrett & Dunner, L.L.P.

(57) ABSTRACT

A content reproduction method is provided, which acquires, from a data transmission apparatus, first streaming data that is used to play a content at a first speed, and records the first streaming data on a storage medium. The content reproduction method plays the content at the first speed, based on the stored first streaming data. The content reproduction method also starts acquisition of second streaming data in response to a varied-speed reproduction request for the content, wherein the second streaming data is used to play the content at a second speed, and plays the content at a transition speed based on the stored first streaming data, in response to the varied-speed reproduction request. The content reproduction method plays the content at the second speed based on the second streaming data, after the acquisition of the second streaming data progresses to a reproduction preparation complete state.

10 Claims, 14 Drawing Sheets

U.S. PATENT DOCUMENTS

| | | | |
|---|---|---|---|
| 6,173,322 B1* | 1/2001 | Hu | 709/224 |
| 6,233,389 B1* | 5/2001 | Barton et al. | 386/46 |
| 6,310,886 B1* | 10/2001 | Barton | 370/462 |
| 6,327,418 B1* | 12/2001 | Barton | 386/46 |
| 6,327,421 B1* | 12/2001 | Tiwari et al. | 386/68 |
| 6,356,545 B1* | 3/2002 | Vargo et al. | 370/355 |
| 6,643,083 B2* | 11/2003 | Korst et al. | 360/48 |
| 6,697,432 B2* | 2/2004 | Yanagihara et al. | 375/240.26 |
| 6,788,877 B1* | 9/2004 | Hoshi | 386/264 |
| 6,965,724 B1* | 11/2005 | Boccon-Gibod et al. | 386/344 |
| 7,212,727 B2* | 5/2007 | Senoh | 386/351 |
| 7,593,620 B2* | 9/2009 | Surcouf et al. | 386/343 |
| 7,743,183 B2* | 6/2010 | Virdi et al. | 710/52 |
| 2002/0036856 A1* | 3/2002 | Korst et al. | 360/55 |
| 2002/0118954 A1* | 8/2002 | Barton et al. | 386/83 |
| 2003/0007780 A1* | 1/2003 | Senoh | 386/68 |
| 2003/0051237 A1* | 3/2003 | Sako et al. | 725/31 |
| 2003/0071971 A1* | 4/2003 | Jo | 352/44 |
| 2003/0078930 A1* | 4/2003 | Surcouf et al. | 707/10 |
| 2003/0179669 A1* | 9/2003 | Takahashi et al. | 369/47.14 |
| 2004/0264930 A1* | 12/2004 | Yoo et al. | 386/95 |
| 2006/0098741 A1* | 5/2006 | Unoki et al. | 375/240.25 |
| 2006/0120243 A1* | 6/2006 | Kurita | 369/59.19 |
| 2006/0269221 A1* | 11/2006 | Hashimoto et al. | 386/68 |
| 2006/0280444 A1* | 12/2006 | Kawakami et al. | 386/95 |
| 2007/0011357 A1* | 1/2007 | Watanabe et al. | 709/249 |
| 2007/0022208 A1* | 1/2007 | Hashimoto et al. | 709/231 |
| 2007/0047910 A1* | 3/2007 | Chiba | 386/95 |
| 2007/0071396 A1* | 3/2007 | Tanaka et al. | 386/68 |
| 2007/0266411 A1* | 11/2007 | Yamamoto et al. | 725/88 |
| 2008/0175563 A1* | 7/2008 | Yoon | 386/111 |
| 2008/0235742 A1* | 9/2008 | Osaki et al. | 725/100 |

FOREIGN PATENT DOCUMENTS

| | | | |
|---|---|---|---|
| JP | 2005318250 A | * | 11/2005 |
| JP | 2007318532 A | * | 12/2007 |
| WO | WO 01/74076 | | 10/2001 |
| WO | WO 2005062619 A1 | * | 7/2005 |

* cited by examiner

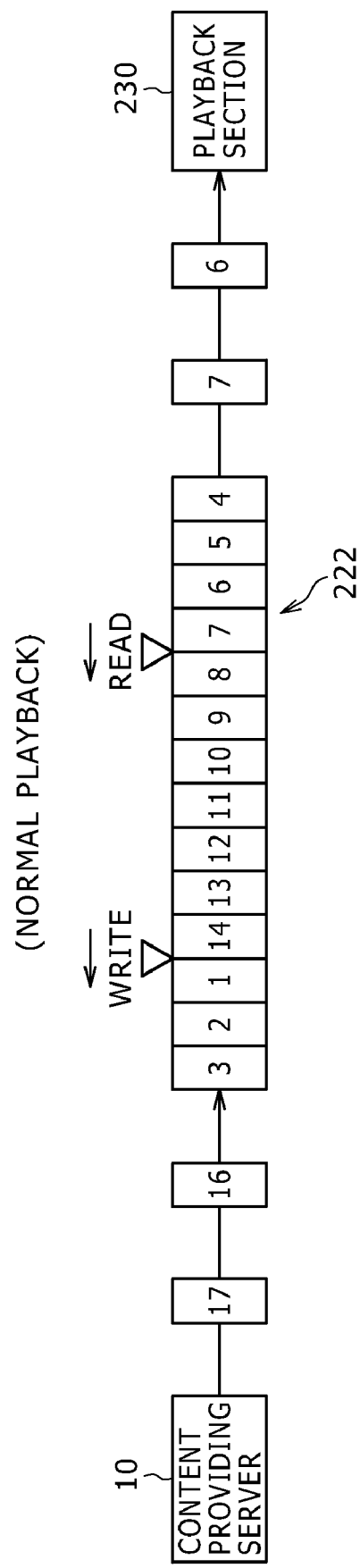

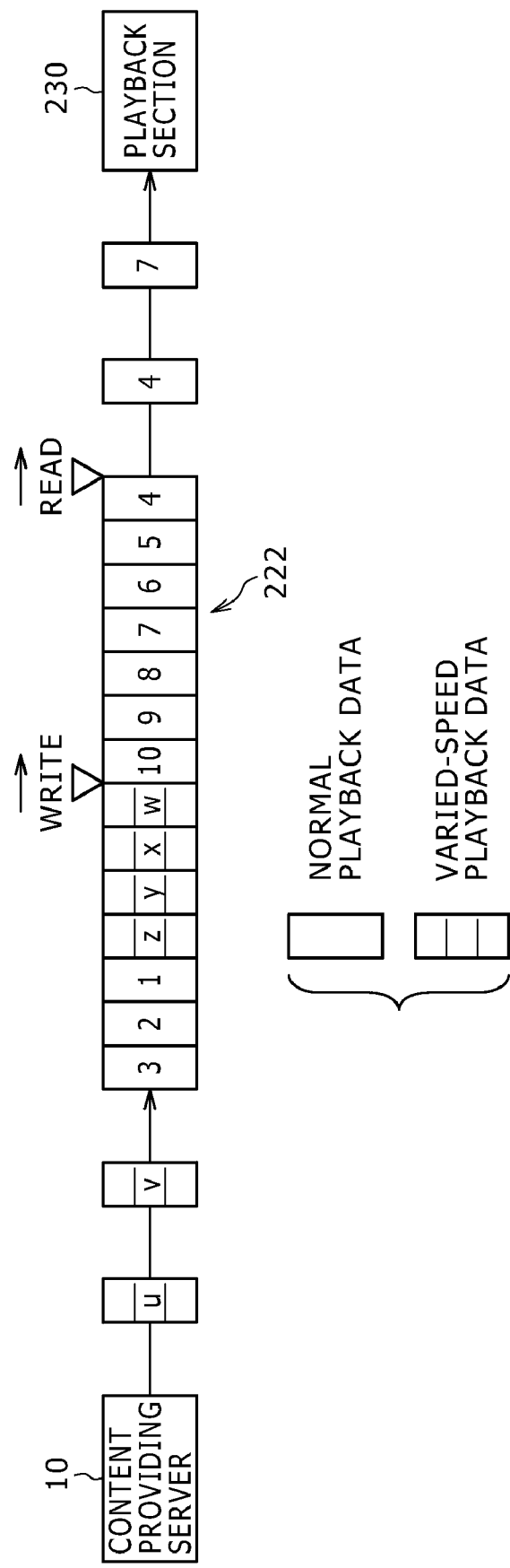

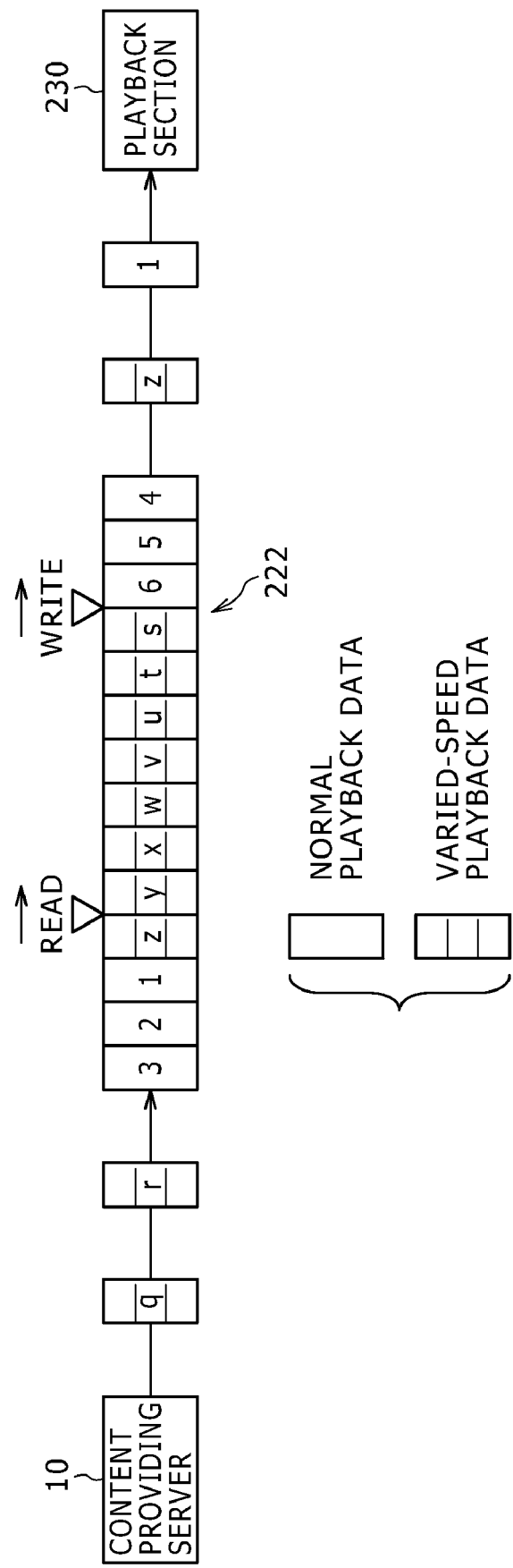

CONTENT REPRODUCTION APPRATUS, CONTENT REPRODUCTION METHOD, AND CONTENT REPRODUCTION SYSTEM WITH VARIED-SPEED REPRODUCTION REQUESTS

RELATED APPLICATIONS

The present invention contains subject matter related to Japanese Patent Application JP 2007-231520, filed in the Japan Patent Office on Sep. 6, 2007, the entire contents of which being incorporated herein by reference.

FIELD OF THE INVENTION

The present invention relates to a content reproduction apparatus, a content reproduction method, and a content reproduction system which are capable of quickly handling a user request for varied-speed content reproduction.

DESCRIPTION OF RELATED ART

In recent years, services of transmitting a content from a content providing server to a user terminal via an Internet protocol (IP) network have been proposed. For example, Japanese Patent Laid-open No. Hei9-37225 describes a service in which a media server delivers video image information to a terminal via a communications network. Examples of such a service include a download service and a streaming service (a VoD streaming service). In the download service, the user terminal starts reproduction of the content after the user terminal receives all content data from the content providing server.

On the other hand, in the streaming service, the content providing server transmits streaming data of the content to the user terminal in an on-demand manner by responding to a user request. While the transmission of the streaming data of the content is in progress, the user terminal plays the content based on the streaming data already received. By using the user terminal, the user is able to request the content providing server to offer "trick play" of the content, such as fast-forwarding, pause, or varied-speed reproduction of the content. The content providing server has streaming data used for normal reproduction and streaming data used for varied-speed reproduction. If the content providing server receives a request for the varied-speed reproduction from the user, the content providing server shifts from transmitting the normal reproduction streaming data to transmitting the varied-speed reproduction streaming data.

Details of a method of shifting from the normal reproduction to the varied-speed reproduction of the content will now be described below.

First, if the request for the varied-speed reproduction of the content is received from the user, the user terminal requests the content providing server to stop transmission of the normal reproduction streaming data.

Second, in response to the request from the user terminal to stop the transmission of the normal reproduction streaming data, the content providing server stops the transmission of the normal reproduction streaming data. Thus, even after the user makes the request for the varied-speed reproduction of the content, the normal reproduction streaming data will be transmitted from the content providing server to the user terminal for a certain period of time.

Third, the content providing server notifies the user terminal that the content providing server has accepted the request from the user terminal to stop the transmission of the normal reproduction streaming data.

Fourth, the user terminal continues to play the content based on the normal reproduction streaming data until the user terminal receives all the normal reproduction streaming data that has already been transmitted from the content providing server and which remains on the network, for example.

Fifth, the user terminal requests the content providing server to transmit the varied-speed reproduction streaming data.

Sixth, the content providing server transmits the varied-speed reproduction streaming data to the user terminal in response to the request from the user terminal.

Seventh, the user terminal plays the content at a varied speed based on the varied-speed reproduction streaming data, after playing the content based on the normal reproduction streaming data stored in a buffer.

In the above-described method of shifting from the normal reproduction to the varied-speed reproduction of the content, there may be a time lag between the user's making the request for the varied-speed reproduction and start of the reproduction of the content based on the varied-speed reproduction streaming data.

SUMMARY OF THE INVENTION

In accordance with a disclosed embodiment, there is provided a content reproduction apparatus, comprising: a data acquisition section configured to acquire, from a data transmission apparatus, first streaming data that is used to play a content at a first speed; a recording section configured to record the first streaming data acquired by the data acquisition section on a storage medium; a reproduction section configured to play the content at the first speed, based on the stored first streaming data; an acquisition control section configured to direct the data acquisition section to start acquiring second streaming data in response to a varied-speed reproduction request for the content, wherein the second streaming data is used to play the content at a second speed; and a reproduction control section configured to direct the reproduction section to play the content at a transition speed based on the stored first streaming data, in response to the varied-speed reproduction request, and direct the reproduction section to play the content at the second speed based on the second streaming data, after acquisition of the second streaming data by the data acquisition section progresses to a reproduction preparation complete state.

In accordance with a disclosed embodiment, there is further provided a content reproduction method, comprising the steps of: acquiring, from a data transmission apparatus, first streaming data that is used to play a content at a first speed; recording the first streaming data on a storage medium; playing the content at the first speed, based on the stored first streaming data; starting acquisition of second streaming data in response to a varied-speed reproduction request for the content, wherein the second streaming data is used to play the content at a second speed; playing the content at a transition speed based on the stored first streaming data, in response to the varied-speed reproduction request; and playing the content at the second speed based on the second streaming data, after the acquisition of the second streaming data progresses to a reproduction preparation complete state.

In accordance with a disclosed embodiment, there is further provided a computer-readable medium storing a program, which, when executed by a processor, causes the processor to perform a content reproduction method, the method comprising: acquiring, from a data transmission apparatus, first streaming data that is used to play a content at a first speed; recording the first streaming data on a storage medium; playing the content at the first speed, based on the stored first streaming data; starting acquisition of second streaming data in response to a varied-speed reproduction request for the content, wherein the second streaming data is used to play the content at a second speed; playing the content at a transition speed based on the stored first streaming data, in response to the varied-speed reproduction request; and playing the content at the second speed based on the second streaming data, after the acquisition of the second streaming data progresses to a reproduction preparation complete state.

In accordance with a disclosed embodiment, there is further provided a content reproduction system, comprising: a data transmission apparatus configured to transmit streaming data of a content; and a content reproduction apparatus configured to play the content based on the streaming data transmitted from the data transmission apparatus, the content reproduction apparatus comprising: a data acquisition section configured to acquire, from the data transmission apparatus, first streaming data that is used to play a content at a first speed; a recording section configured to record the first streaming data acquired by the data acquisition section on a storage medium; a reproduction section configured to play the content at the first speed, based on the stored first streaming data; an acquisition control section configured to direct the data acquisition section to start acquiring second streaming data in response to a varied-speed reproduction request for the content, wherein the second streaming data is used to play the content at a second speed; and a reproduction control section configured to: direct the reproduction section to play the content at a transition speed based on the stored first streaming data, in response to the varied-speed reproduction request; and direct the reproduction section to play the content at the second speed based on the second streaming data, after acquisition of the second streaming data by the data acquisition section progresses to a reproduction preparation complete state.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate disclosed embodiments and together with the description, serve to explain the principles of the invention.

FIG. 12 is a diagram illustrating how the normal reproduction of the content may be performed;

FIG. 13 is a diagram illustrating how the transitional reproduction of the content may be performed; and FIG. 14 is a diagram illustrating how the varied-speed reproduction of the content may be performed in a reverse direction.

DESCRIPTION OF THE EMBODIMENTS

Figure 1:
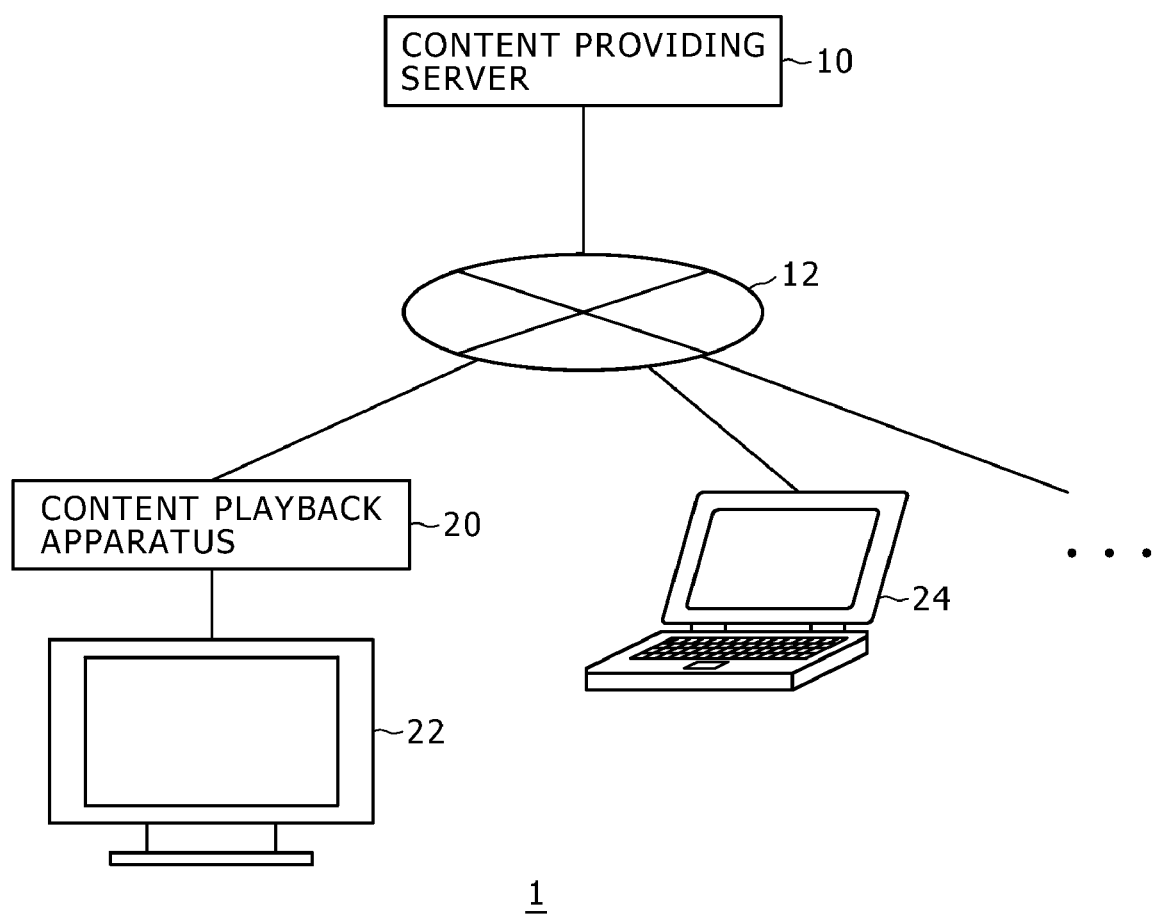
FIG. 1 is a diagram showing the structure of a content reproduction system according to disclosed embodiments.

In this content reproduction apparatus, a data acquisition section may start acquisition of second streaming data from a data transmission apparatus in response to a varied-speed reproduction request with respect to the content, and after a certain period of time, the state of the acquisition of the second streaming data may reach the reproduction preparation complete state. In addition, in response to the varied-speed reproduction request with respect to the content, a reproduction control section may direct the reproduction section to play the content at a transition speed based on first streaming data recorded on the storage medium. Further, after the state of the acquisition of the second streaming data has reached a reproduction preparation complete state, the reproduction control section may direct the reproduction section to play the content at the second speed based on the second streaming data recorded on the storage medium. Therefore, if the varied-speed reproduction request has been inputted with respect to the content, it is possible to quickly shift from the content reproduction at the first speed to the content reproduction at the transition speed using the first streaming data recorded on the storage medium.

If the varied-speed reproduction request is inputted, the reproduction control section may calculate a third speed that allows the first streaming data recorded on the storage medium to be played by a time at which the reproduction preparation complete state is expected to be reached, and may use the third speed as the transition speed. In this case, the reproduction section is capable of shifting from the content reproduction at the transition speed to the content reproduction at the second speed while maintaining continuity of the content.

Also, if the varied-speed reproduction request is inputted, the reproduction control section may calculate a third speed that allows the first streaming data recorded on the storage medium to be played by a time at which the reproduction preparation complete state is expected to be reached. If the second speed is lower than the third speed, the reproduction control section may use the second speed as the transition speed.

In this case, the reproduction section may be capable of shifting to the content reproduction at the second speed immediately after receiving the varied-speed reproduction request. This enhances convenience for the user. Moreover, the second speed may be lower than the third speed, which allows the first streaming data recorded on the storage medium to be played by the time at which the reproduction preparation complete state is expected to be reached. Therefore, if the reproduction section plays the content at the second speed based on the first streaming data recorded on the storage medium in response to the varied-speed reproduction request, it may be expected that this reproduction will continue until the reproduction preparation complete state is reached. Therefore, the reproduction section may be capable of shifting from the reproduction of the content based on the first streaming data to the reproduction of the content based on the second streaming data while ensuring continuity, without stopping the reproduction of the content.

In the case in which the reproduction control section uses the second speed as the transition speed, the acquisition control section may estimate a location in the content at which the reproduction section will be playing the content based on the first streaming data if the reproduction preparation complete state is reached, and control the data acquisition section to start acquisition of the second streaming data with a location corresponding to the estimated location in the content. In this case, the reproduction section may be capable of shifting to the reproduction of the content at the second speed based on the second streaming data while ensuring the continuity of the content reproduction and the continuity of the content.

In some embodiments, the storage medium is a ring buffer. Accordingly, if the varied-speed reproduction request is a request for varied-speed reproduction in a reverse direction, in some embodiments, the recording section does not record, on the storage medium, the first streaming data that has been acquired by the data acquisition section since the varied-speed reproduction request is inputted. In this case, it may be possible to prevent the first streaming data recorded on the storage medium, which can be used to play the content in the reverse direction, from being overwritten by the first streaming data to be used to play the content in a normal direction.

A program may be capable of causing hardware resources of the computer, such as a CPU, a ROM, and a RAM, to perform functions of the data acquisition section, the recording section, the reproduction section, the acquisition control section, and the reproduction control section. In other words, the program may be capable of causing a computer, by executing the program, to function as the above-described content reproduction apparatus.

The content reproduction apparatus, the content reproduction method, the program, and the content reproduction system according to embodiments consistent with the present invention make it possible to quickly handle the request from the user for the varied-speed reproduction.

Reference will now be made in detail to the present embodiments of the invention, examples of which are illustrated in the accompanying drawings. Wherever possible, the same reference numbers will be used throughout the drawings to refer to the same or like parts.

[1] Outline of Content Reproduction System Embodiments.

[2] Object of Disclosed Embodiments.

[3] Detailed Description of Content Reproduction Apparatus.

[3-1] Hardware Structure of Content Reproduction Apparatus.

[3-2] Functions of Content Reproduction Apparatus.

[3-3] Flow of Operation of Content Reproduction Apparatus.

[3-4] Another Exemplary Operation of Content Reproduction Apparatus.

[4] Summary

[1] Outline of a Content Reproduction System

First, an outline of a content reproduction system 1 will be described below with reference to FIGS. 1, 2, 3, and 4.

FIG. 1 is a diagram showing the structure of a content reproduction system 1. As shown in FIG. 1, the content reproduction system 1 may include a content providing server 10, a content reproduction apparatus 20, a display apparatus 22, and a personal computer (PC) 24.

The content providing server 10 may store streaming content data. The content providing server 10 may function as a data transmission apparatus that transmits the streaming data in response to a request from the content reproduction apparatus 20 or the PC 24, which may be connected to the content providing server 10 via a communications network 12. The content providing server 10 may store and is capable of transmitting streaming data (i.e., normal reproduction streaming data) used for playing the content in a normal manner, and streaming data (varied-speed reproduction streaming data) used for playing the content at a varied speed (e.g., a double speed, a ten times speed, a thirty times speed, etc.).

The term content as used herein refers to various types of data, including: audio data, such as data of music, a lecture, and a radio program; video data, such as data of a film, a television program, a video program, a photograph, a document, a painting, and a diagram; and other data, such as data of a game and software.

The communications network 12 may include: cable, such as a copper wire or a fiber-optic cable; a transmission path for data such as radio waves; a relay station for the data, such as a router or a base station for controlling communication; and so on. Note that the communications network 12 may be a network based on the Internet protocol.

Based on requests from the user, the content reproduction apparatus 20 may perform various processes in connection with the content providing server 10. For example, if the content reproduction apparatus 20 receives a request for content reproduction from the user, the content reproduction apparatus 20 may request the content providing server 10 to transmit the streaming data of the content, thereby acquiring the streaming data of the content from the content providing server 10. Then, based on the acquired streaming data, the content reproduction apparatus 20 may play the content. Video and audio of the played content may be outputted via the display apparatus 22.

Note that, in FIG. 1, the content reproduction apparatus 20 is provided separately from the display apparatus 22, which is used to output the played content. However, the content reproduction apparatus 20 and the display apparatus 22 may be integrated into one unit, as is the case of PC 24, for example.

Also note that, in FIG. 1, the content reproduction apparatus 20 and the display apparatus 22 are integrated as the PC 24. However, disclosed embodiments are not limited to this example. For example, the content reproduction apparatus 20 or the PC 24 may be an information processing apparatus such as a home video processing apparatus (e.g., a DVD recorder, a video recorder, etc.), a cellular phone, a personal handyphone system (PHS), a portable audio player, a portable video processing apparatus, a personal digital assistant (PDA), a home game machine, a portable game machine, or a household electrical appliance.

Next, referring to FIG. 2, a flow of content reproduction in the content reproduction apparatus 20 will now be described below.

Figure 2:
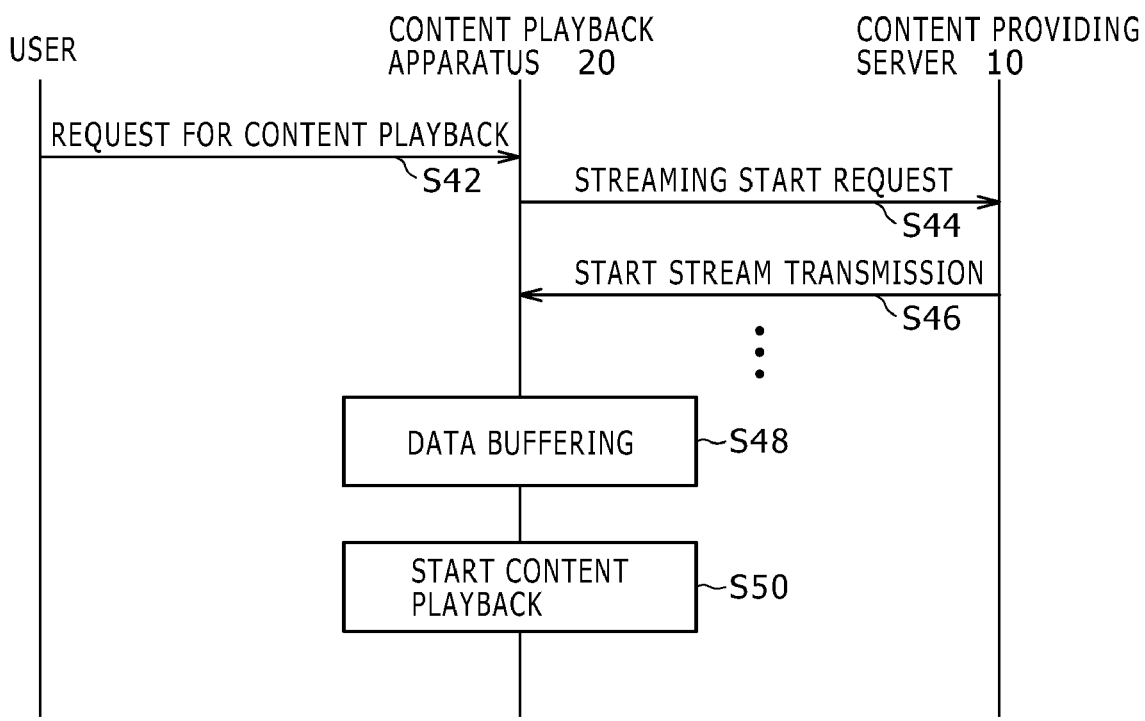
FIG. 2 is a sequence diagram showing a flow of content reproduction in the content reproduction system.

FIG. 2 is a sequence diagram showing the flow of the content reproduction in the content reproduction system 1. First, if the request for the content reproduction has been inputted by the user using a remote controller, for example (S42), the content reproduction apparatus 20 may request the content providing server 10 to start the transmission of the streaming data of the content (i.e., makes a streaming start request) (S44).

In response to the streaming start request from the content reproduction apparatus 20, the content providing server 10 may start the transmission of the streaming data of the content to the content reproduction apparatus 20 (S46). Then, the content reproduction apparatus 20 may buffer the streaming data transmitted from the content providing server 10 (S48).

If the data amount of the buffered streaming data has become sufficient to start the reproduction of the content, the content reproduction apparatus 20 may start the reproduction of the content based on the buffered streaming data (S50). In the above-described manner, the content reproduction apparatus 20 is capable of playing the content while receiving the streaming data, without the need to wait for the whole data of the content to be received.

Next, referring to FIG. 3, a procedure in which the content reproduction is paused and then resumed in the content reproduction apparatus 20 will now be described below.

Figure 3:
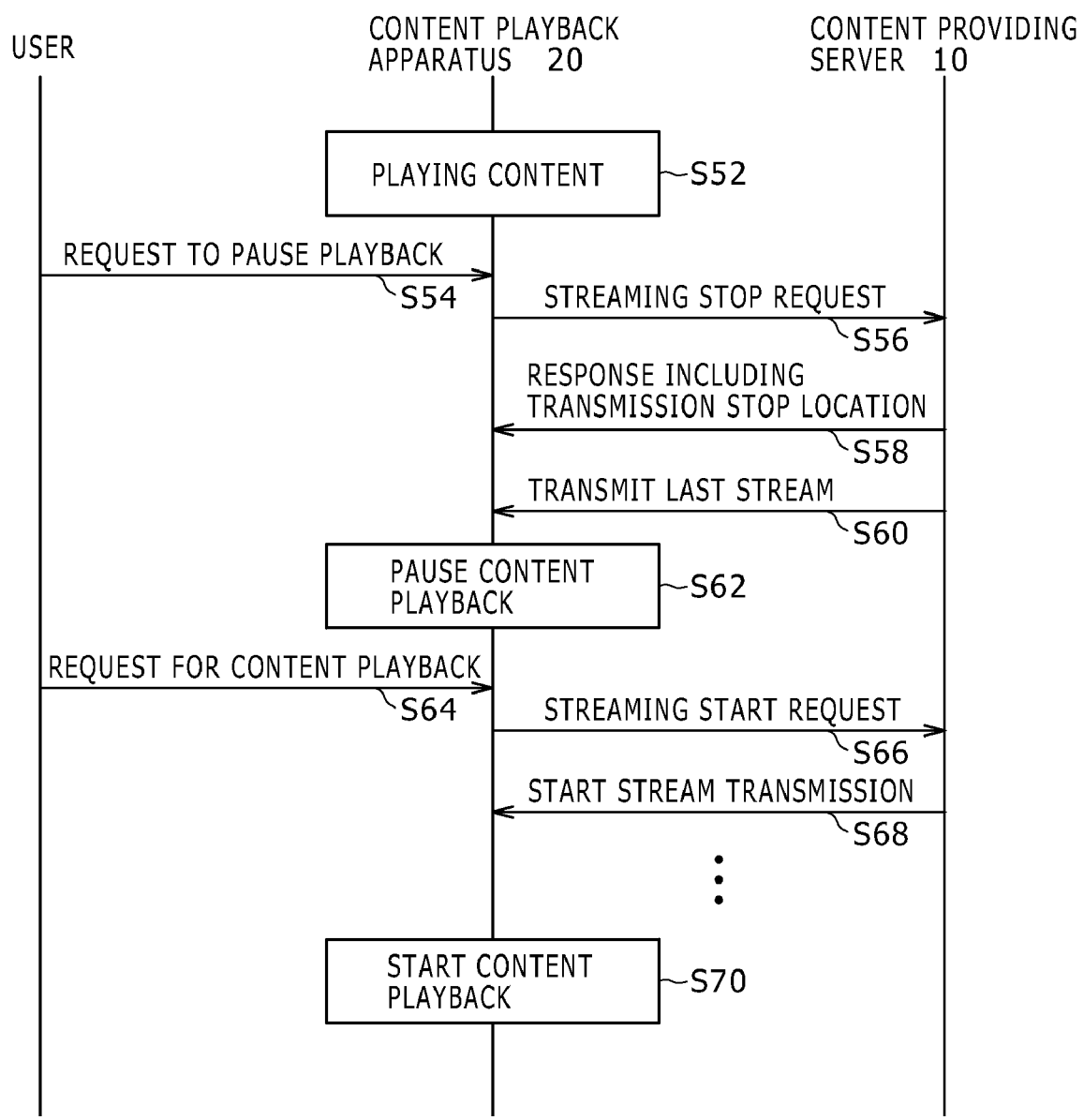
FIG. 3 is a sequence diagram showing a procedure in which the content reproduction is paused and then resumed in the content reproduction system.

FIG. 3 is a sequence diagram showing the procedure in which the content reproduction is paused and then resumed in the content reproduction system 1. The content reproduction apparatus 20 may play the content while acquiring the streaming data of the content from the content providing server 10 (S52). In this situation, the user may request the content reproduction apparatus 20 to pause the content reproduction (S54).

If the content reproduction apparatus 20 has received the request to pause the content reproduction, the content reproduction apparatus 20 may request the content providing server 10 to stop the transmission of the streaming data (i.e., makes a streaming stop request) (S56). Then, the content providing server 10 may transmit, to the content reproduction apparatus 20, a response indicating that the content providing server 10 has accepted the streaming stop request from the content reproduction apparatus 20 (S58). Then, the last streaming data that has been transmitted from the content providing server 10 arrives at the content reproduction apparatus 20 (S60).

If the content reproduction apparatus 20 has acquired the last streaming data, the content reproduction apparatus 20 may pause the content reproduction (S62). Thereafter, if the content reproduction apparatus 20 has received the request for the content reproduction from the user (S64), the content reproduction apparatus 20 may request the content providing server 10 to start the transmission of the streaming data of the content (i.e., makes the streaming start request) (S66).

In response to the streaming start request from the content reproduction apparatus 20, the content providing server 10 may start the transmission of the streaming data of the content to the content reproduction apparatus 20 (S68). Then, the content reproduction apparatus 20 may buffer the streaming data transmitted from the content providing server 10.

If the data amount of the buffered streaming data has become sufficient to start the reproduction of the content, the content reproduction apparatus 20 may start the reproduction of the content based on the buffered streaming data (S70). In the above-described manner, the content reproduction apparatus 20 is capable of stopping acquisition of the streaming data in response to the request from the user to pause the content reproduction, and resuming the acquisition of the streaming data in response to the request for the content reproduction.

Here, referring to FIG. 4, the streaming data and packetized elementary streams (PESs), which can be obtained from the streaming data, will now be described below.

Figure 4:
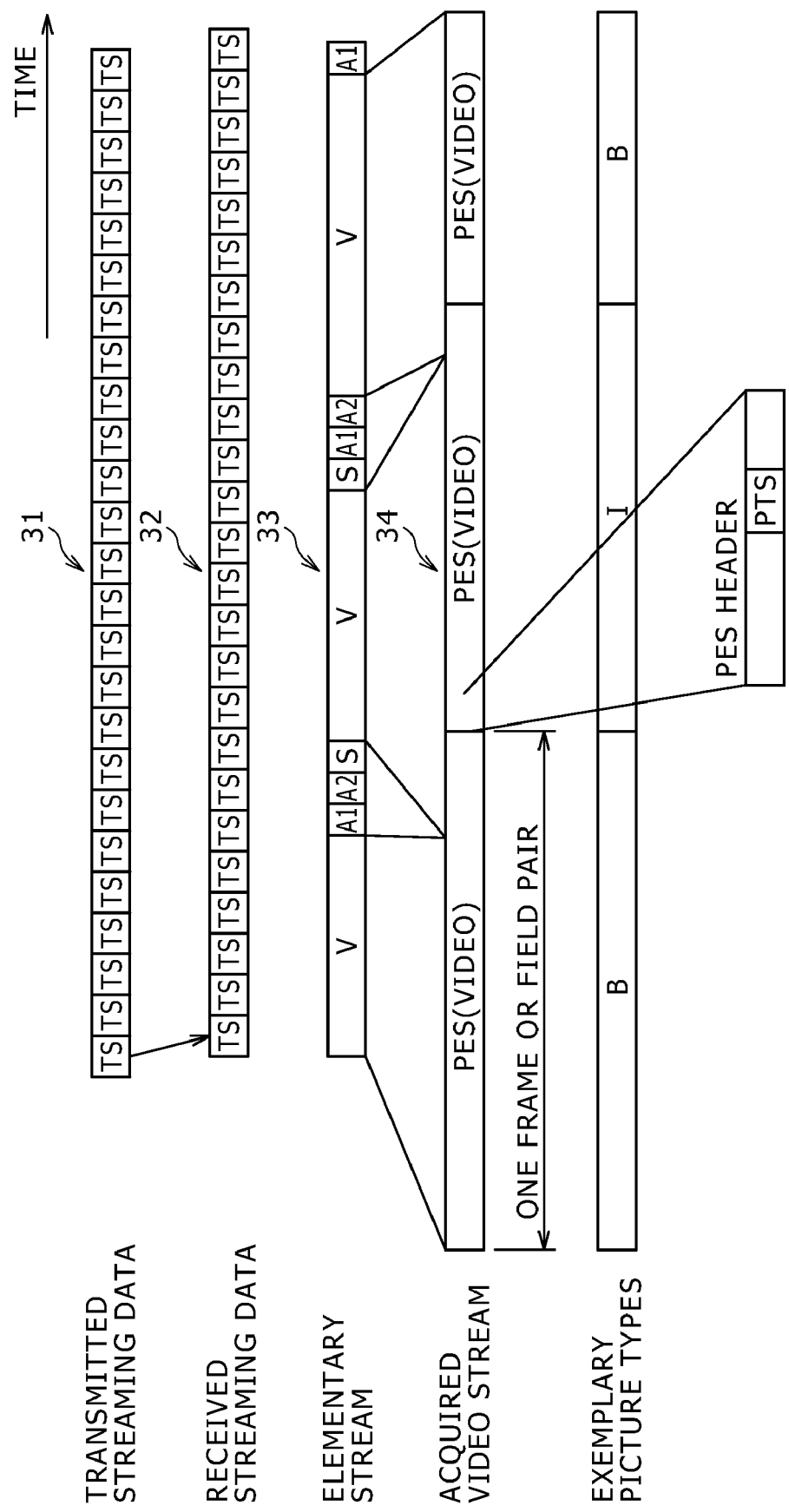
FIG. 4 is a diagram showing relationships between streaming data and PESs.

FIG. 4 is a diagram showing relationships between the streaming data and the PESs. The uppermost figure in FIG. 4 represents transmitted streaming data 31, which is, in some embodiments, the streaming data transmitted by the content providing server 10. A second figure from the top in FIG. 4 represents received streaming data 32, which is, in some embodiments, the streaming data received by the content reproduction apparatus 20 from the content providing server 10.

The streaming data of the content, such as the transmitted streaming data 31 and the received streaming data 32, may be composed of a plurality of transport packets (TS packets) as shown in FIG. 4. The TS packets may include data of a plurality of media classes, such as video data, audio data, and subtitle data. A time stamp may be described in each TS packet. In some embodiments, the time stamps indicate points in time at which the respective TS packets are transmitted from the content providing server 10. The time stamps may be implemented as a count value that increases in increments of one at intervals of 27 MHz.

The time stamps may be used to identify a playing time of the content. Therefore, the time stamps may have a function as time information. Further, by referring to the time stamps, it may be possible to estimate the order of the TS packets. Therefore, the time stamps may have a function as order information as well.

After the content providing server 10 transmits the transmitted streaming data 31, a delay may occur before the content reproduction apparatus 20 receives the transmitted streaming data 31 as the received streaming data 32. Accordingly, in FIG. 4, the received streaming data 32 is shifted slightly from the transmitted streaming data 31 along a time axis.

A third figure from the top in FIG. 4 represents an elementary (E) stream 33, which may be obtained from each of the TS packets that constitute the streaming data. A fourth figure from the top in FIG. 4 represents packetized elementary streams (PESs) 34. The PESs 34 may be obtained by dividing the E stream 33 into variable-length blocks and adding header information to each of the blocks.

The header information added to each of the PESs is referred to as a PES header. The PES header includes presentation time stamp (PTS) information. In some embodiments, the PTS information has a function as time information that indicates a point in time, determined from a certain reference point, at which the corresponding PES is displayed.

A lowermost figure in FIG. 4 represents examples of picture types of the PESs. The PES may be a B picture, an I picture, or a P picture, for example.

[2] Object of Present Embodiment

The outline of the content reproduction system 1 according to disclosed embodiments has been described above. Next, an object of disclosed embodiments will now be described below, using a content reproduction apparatus 20' as a comparative example.

Figure 5:
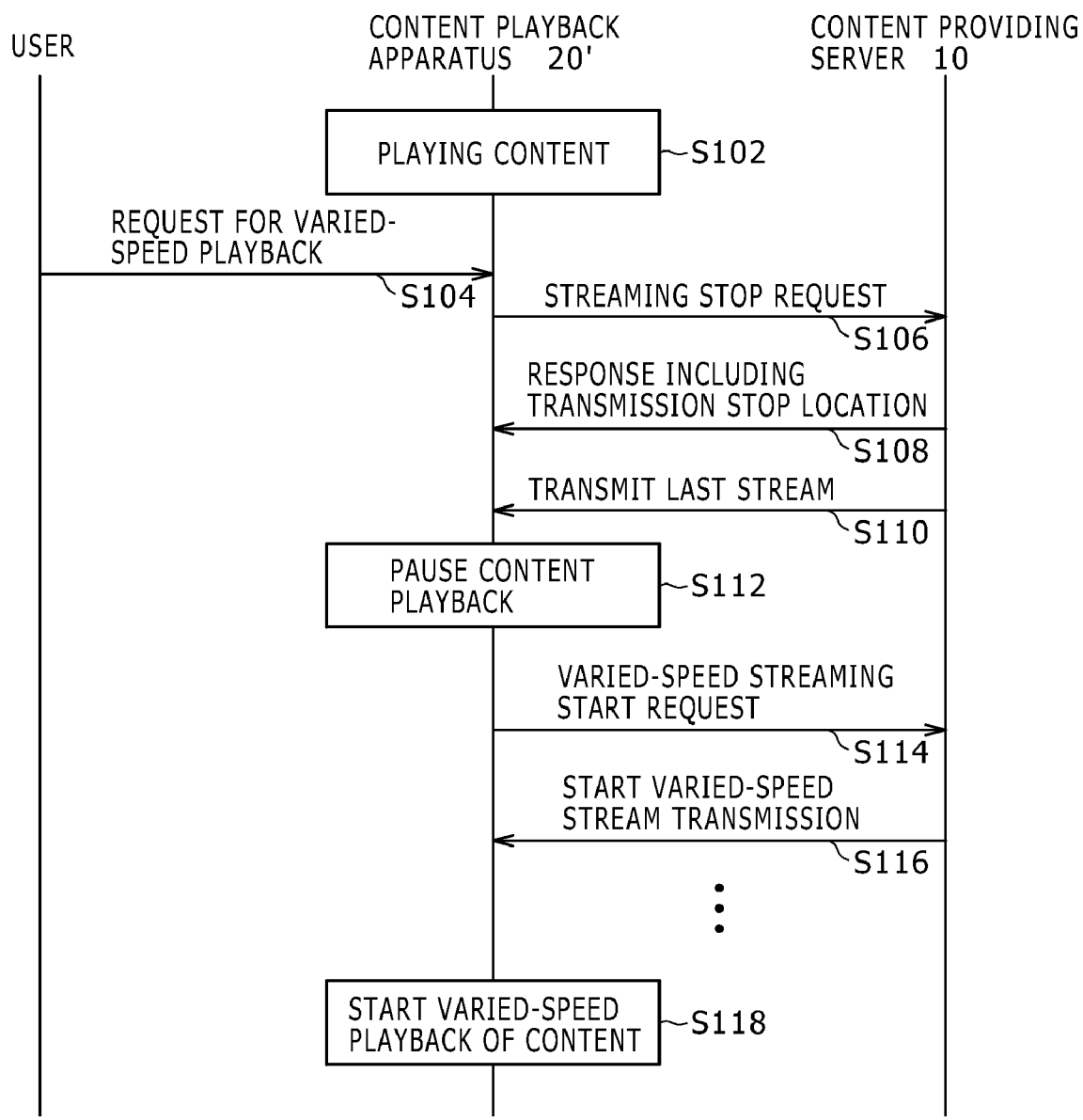
FIG. 5 is a diagram showing an exemplary varied-speed reproduction operation performed by a content reproduction apparatus related to disclosed embodiments.

FIG. 5 is a diagram showing an exemplary varied-speed reproduction operation performed by the content reproduction apparatus 20'. The content reproduction apparatus 20' may play the content in the normal manner while acquiring the normal reproduction streaming data of the content from the content providing server 10 (S102). In this situation, the user may request the content reproduction apparatus 20' to perform varied-speed reproduction of the content (S104).

If the content reproduction apparatus 20' has received the request for the varied-speed reproduction, the content reproduction apparatus 20' may request the content providing server 10 to stop the transmission of the normal reproduction streaming data (i.e., makes the streaming stop request) (S106). Then, the content providing server 10 may transmit, to the content reproduction apparatus 20', a response indicating that the content providing server 10 has accepted the streaming stop request from the content reproduction apparatus 20' (S108). Then, the last normal reproduction streaming data that has been transmitted from the content providing server 10 may arrive at the content reproduction apparatus 20' (S110).

If the content reproduction apparatus 20' has acquired the last normal reproduction streaming data, the content reproduction apparatus 20' may pause normal reproduction of the content (S112). Thereafter, the content reproduction apparatus 20' may request the content providing server 10 to start transmission of the varied-speed reproduction streaming data of the content (i.e., makes the streaming start request) (S114).

In response to the streaming start request from the content reproduction apparatus 20', the content providing server 10 may start the transmission of the varied-speed reproduction streaming data of the content to the content reproduction apparatus 20' (S116). Then, the content reproduction apparatus 20' may buffer the varied-speed reproduction streaming data transmitted from the content providing server 10.

If the data amount of the buffered streaming data has become sufficient to start the varied-speed reproduction of the content, the content reproduction apparatus 20' may start the varied-speed reproduction of the content based on the buffered varied-speed reproduction streaming data (S118).

In the above-described manner, the content reproduction apparatus 20', as a comparative example, is capable of performing the varied-speed reproduction of the content based on the varied-speed reproduction streaming data in response to the varied-speed reproduction request from the user.

However, as shown in FIG. 5, the content reproduction apparatus 20' is incapable of starting the varied-speed reproduction of the content immediately after receiving the varied-speed reproduction request from the user (S104 to S118). This poor responsiveness may irritate the user, as the content reproduction may be paused for a while after the varied-speed reproduction request is received or a blank may occur before the varied-speed reproduction is started, for example.

In view of the above circumstances, the content reproduction apparatus 20 has been conceived. The content reproduction apparatus 20 may be capable of quickly handling the request from the user for the varied-speed reproduction. The content reproduction apparatus 20 will now be described in detail below.

[3] Detailed Description of Content Reproduction Apparatus

[3-1] Hardware Structure of Content Reproduction Apparatus

Figure 6:
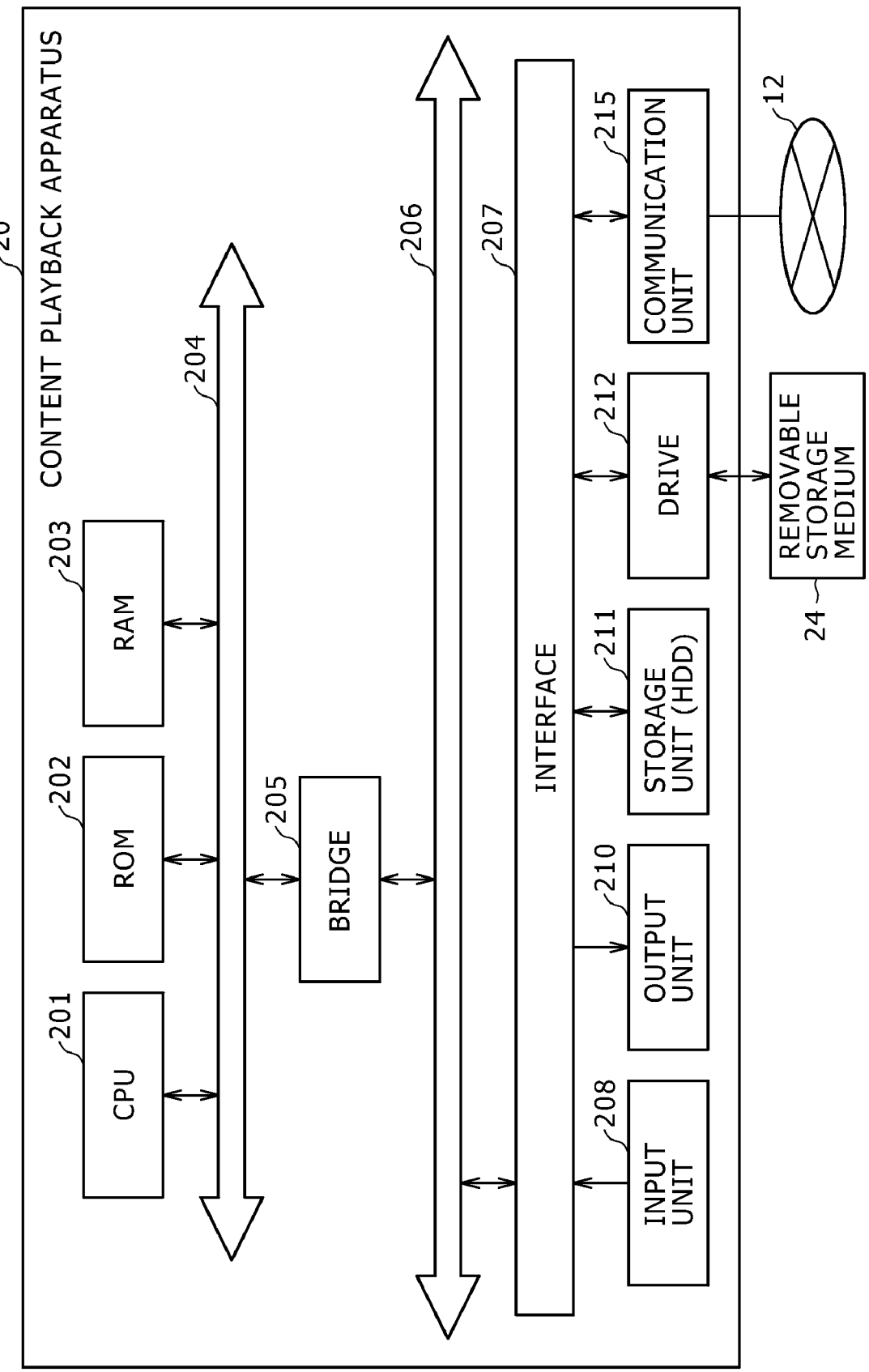
FIG. 6 is a diagram showing a hardware structure of a content reproduction apparatus according to disclosed embodiments.

FIG. 6 is a diagram showing a hardware structure of the content reproduction apparatus 20. The content reproduction apparatus 20 may include a central processing unit (CPU) 201, a read only memory (ROM) 202, a random access memory (RAM) 203, a host bus 204, a bridge 205, an external bus 206, an interface 207, an input unit 208, an output unit 210, a storage unit (HDD) 211, a drive 212, and/or a communication unit 215.

The CPU 201 may function as a processor and a controller, and may direct an overall operation of the content reproduction apparatus 20 in accordance with various programs. The CPU 201 may be a microprocessor. The ROM 202 may store a program used by the CPU 201, an operation parameter, and so on. The RAM 203 may temporarily store a program used in the operation of the CPU 201, a parameter that changes as necessary in the operation of the CPU 201, and so on. The CPU 201, the ROM 202, and the RAM 203 may be connected to one another via the host bus 204, which is formed by a CPU bus or the like.

The host bus 204 may connected to the external bus 206 via the bridge 205. The external bus 206 may be a Peripheral Component Interconnect/Interface (PCI) bus, for example. Note that the host bus 204, the bridge 205, and the external bus 206 do not need to be separate from one another. Instead, functions of all the host bus 204, the bridge 205, and the external bus 206 may be implemented on a single bus.

The input unit 208 may be composed of: an input section used for the user to input information; an input control circuit for generating an input signal based on a user input and outputting the input signal to the CPU 201; and so on, for example. Examples of the input section include a mouse, a keyboard, a touch panel, a button, a microphone, a switch, a lever, and the remote controller. The user of the content reproduction apparatus 20 may operate the input unit 208 to enter various data into the content reproduction apparatus 20 or instruct the content reproduction apparatus 20 on its processing operation.

The output unit 210 may be composed of a display device and an audio output device, for example. Examples of the display device include a cathode ray tube (CRT) display, a liquid crystal display (LCD), an organic light emitting display (OLED), and a lamp. Examples of the audio output device include a loudspeaker and headphones. The output unit 210 outputs the played content, for example. Specifically, the display device may display various information, such as the video data as played, in text or image format. On the other hand, the audio output device converts the audio data or the like as played into sound and outputs the sound.

The storage unit 211 is a unit for storing data, and may be an exemplary storage section of the content reproduction apparatus 20. The storage unit 211 may include: a storage medium; a recording device for recording the data on the storage medium; a reading device for reading the data from the storage medium; a deleting device for deleting the data recorded on the storage medium; and so on. The storage unit 211 is formed by a hard disk drive (HDD), for example. The storage unit 211 may drive a hard disk to store the program executed by the CPU 201 and various data. The streaming data may be stored in the storage unit 211.

The drive 212 may be a reader/writer for a storage medium. The drive 212 may either contained in the content reproduction apparatus 20 or externally attached to the content reproduction apparatus 20. The drive 212 may read information from a removable storage medium 24 mounted thereon, and may output the read information to the RAM 203. Examples of the removable storage medium 24 include a magnetic disk, an optical disk, a magneto-optical disk, and a semiconductor memory.

In some embodiments, the communication unit 215 is a communication interface formed by a communication device or the like used for connection to the communications network 12, for example. Examples of the communication unit 215 include a wireless local area network (LAN) communication device, a wireless USB communication device, and a wired communication device for wired communication. The communication unit 215 may exchange the streaming data and various requests with the content providing server 10 via the communications network 12.

Further, a computer-readable medium which stores the computer program may also be provided. Such computer-readable medium may include optical storage, magnetic storage, solid state storage, CD, DVD, hard disks, floppy disks, RAM, ROM, and/or flash memories.

Note that a hardware structure of the content providing server 10 may be significantly the same as the hardware structure of the content reproduction apparatus 20. Therefore, description of the hardware structure of the content providing server 10 is omitted.

[3-2] Functions of Content Reproduction Apparatus

The hardware structure of the content reproduction apparatus 20 has been described above with reference to FIG. 6. Next, referring to FIGS. 7, 8, 9, and 10, functions of the content reproduction apparatus 20 will now be described below.

Figure 7:
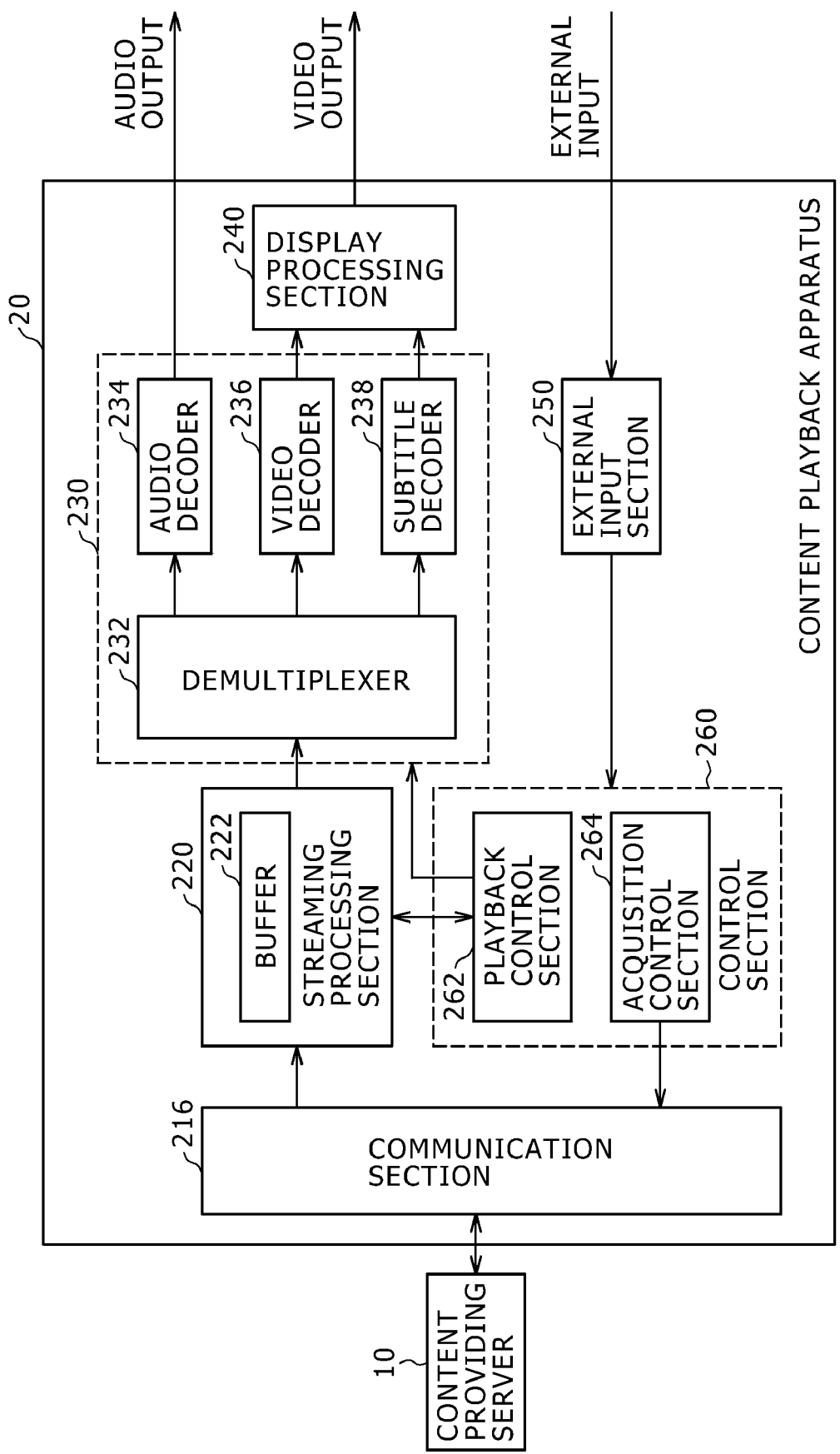
FIG. 7 is a functional block diagram of the content reproduction apparatus according to disclosed embodiments.

FIG. 7 is a functional block diagram of the content reproduction apparatus 20. As shown in FIG. 7, the content reproduction apparatus 20 may include a communication section 216, a streaming processing section 220, a reproduction (playback) section 230, a display processing section 240, an external input section 250, and a control section 260.

The communication section 216 may interface with the content providing server 10, and may operate under control of an acquisition control section 264 in the control section 260. For example, under control of the acquisition control section 264, the communication section 216 may function as a data acquisition section for requesting the content providing server 10 to transmit the streaming data and acquiring the streaming data from the content providing server 10.

The communication section 216 may also performs a communication process in conformity with HyperText Transfer Protocol (HTTP), Real-time Transport Protocol (RTP), Transmission Control Protocol (TCP), User Datagram Protocol (UDP), IP, or the like.

The streaming processing section 220 may function as a recording section for buffering (recording) the streaming data received by the communication section 216 in a buffer 222, which may be a storage medium. The streaming processing section 220 may also function as a supply processing section for supplying the streaming data buffered in the buffer 222 to the reproduction section 230 at an appropriate time.

For example, the streaming processing section 220 may start the supply of the streaming data to the reproduction section 230 if the data amount of the streaming data buffered in the buffer 222 has reached a data amount that does not cause either an overflow or an underflow. The data amount that does not cause either the overflow or the underflow may be half a data amount corresponding to a storage capacity of the buffer 222. The streaming processing section 220 may also performs packet error correction on the streaming data received by the communication section 216.

The reproduction section 230 may include a demultiplexer 232, an audio decoder 234, a video decoder 236, and a subtitle decoder 238.

The demultiplexer 232 may determine whether each of the TS packets that form the streaming data supplied from the streaming processing section 220 is a packet concerning the audio, a packet concerning the video, or a packet concerning the subtitle. The demultiplexer 232 may output the TS packet concerning the audio to the audio decoder 234 as an audio E stream, and may output the TS packet concerning the video to the video decoder 236 as a video E stream. In addition, the demultiplexer 232 may output the TS packet concerning the subtitle to the subtitle decoder 238 as a subtitle E stream.

The audio decoder 234 may decode the audio E stream inputted from the demultiplexer 232 to generate an audio signal. Note that the audio E stream may be encoded with an audio compression format such as MP3 (MPEG-1 Layer-3), AAC (Advanced Audio Codec), LPCM (Linear PCM), WMA9 (Windows Media Audio9), ATRAC (Adaptive TRansform Acoustic Coding), or ATRAC3.

The video decoder 236 may encode the video E stream inputted from the demultiplexer 232 to generate a video signal. Note that the video E stream may be encoded with an image compression format such as MPEG (Moving Picture Experts Group)-1, MPEG-2, or MPEG-4. The subtitle decoder 238 decodes the subtitle E stream inputted from the demultiplexer 232 to generate a subtitle signal.

The reproduction section 230 is capable of reproducing the content at n times the normal speed, by playing varied-speed reproduction streaming data specialized for n times the normal speed. This may be accomplished with a substantially similar process as set forth with respect to the normal reproduction streaming data.

The display processing section 240 may superimpose the subtitle signal generated by the subtitle decoder upon the video signal generated by the video decoder, and may output a resultant signal.

The external input section 250 may be a user interface through which various requests or instructions are inputted from an outside (the user) into the content reproduction apparatus 20. For example, a signal transmitted from the remote controller based on a user operation may be inputted to the external input section 250. Then, the external input section 250 may output a signal representing the inputted request, instruction, or the like to the control section 260. Examples of the various requests include: a request for content reproduction; a request for pause; a request for fast-forwarding; a request for rewinding; the varied-speed reproduction request; and a request for reverse reproduction.

The control section 260 may include a reproduction control section 262 and the acquisition control section 264.

Based on the signal inputted from the external input section 250, the reproduction control section 262 may direct the streaming processing section 220 and the reproduction section 230. For example, if the request to pause the content reproduction is inputted from the external input section 250, the reproduction control section 262 may stop the supply of the streaming data from the streaming processing section 220 to the reproduction section 230 at a prescribed time.

Based on the signal inputted from the external input section 250, the acquisition control section 264 may direct the communication section 216. For example, if the request for the content reproduction is inputted from the external input section 250, the acquisition control section 264 may direct the communication section 216 to request the content providing server 10 to transmit the streaming data. Further, if the request to pause the content reproduction is inputted from the external input section 250, the acquisition control section 264 may direct the communication section 216 to request the content providing server 10 to stop the transmission of the streaming data.

Still further, if the user has made the request for the varied-speed reproduction, the acquisition control section 264 may direct the communication section 216 to request the content providing server 10 to transmit varied-speed reproduction streaming data specialized for a speed specified by the user. In response to this request, the content providing server 10 may transmit the varied-speed reproduction streaming data specialized for the specified speed or varied-speed reproduction streaming data specialized for a speed close to the specified speed. For example, if the communication section 216 requests the content providing server 10 to transmit varied-speed reproduction streaming data specialized for eight times the normal speed, the content providing server 10 may transmit the varied-speed reproduction streaming data specialized for eight times the normal speed or varied-speed reproduction streaming data specialized for ten times the normal speed.

If the varied-speed reproduction request has been made by the user, the reproduction control section 262 may direct the reproduction section 230 to play the content at a transition speed based on the normal reproduction streaming data, without waiting for the varied-speed reproduction streaming data to be buffered in the buffer 222. In other words, if the varied-speed reproduction request has been made by the user, the reproduction control section 262 may be capable of immediately starting pseudo varied-speed reproduction (transitional reproduction), resulting in improved convenience for the user. Details of this operation will now be described below with reference to FIGS. 8 to 10.

Figure 8:
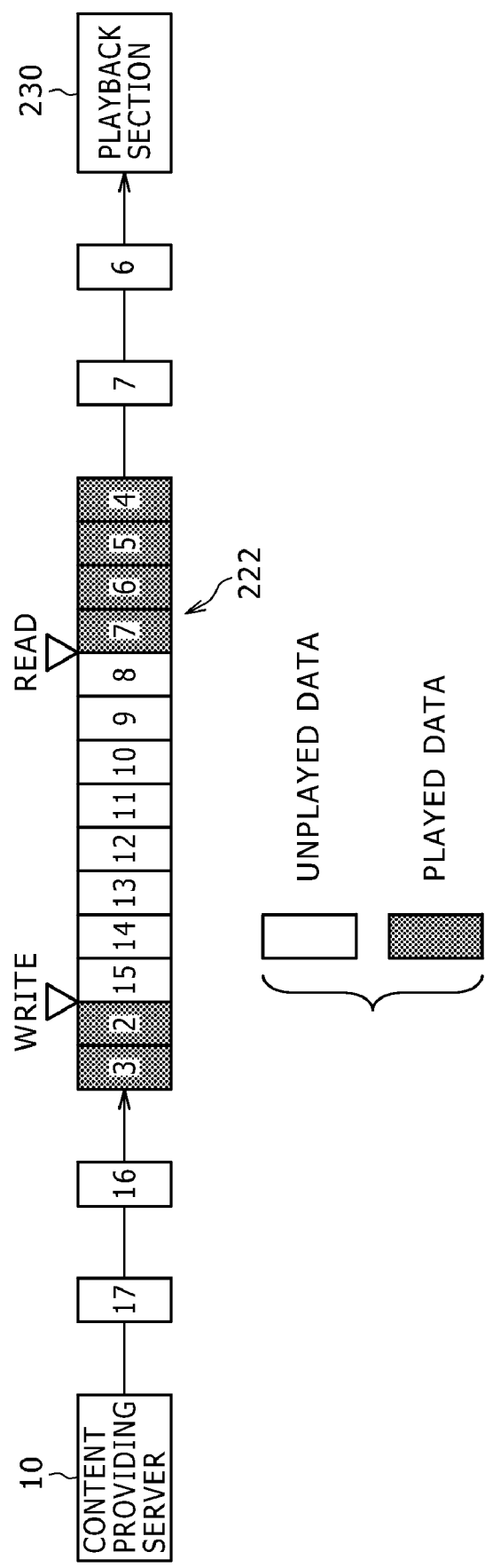
FIG. 8 is a diagram illustrating how normal reproduction of the content may be performed.

FIG. 8 is a diagram illustrating how the normal reproduction of the content is performed. Note that, in FIGS. 8 to 10, only the buffer 222 and the reproduction section 230 are shown of all the components of the content reproduction apparatus 20, while the other components thereof are omitted.

As illustrated in FIG. 8, at the time of the normal reproduction of the content, the normal reproduction streaming data may be transmitted from the content providing server 10, and the normal reproduction streaming data (i.e., first streaming data) is supplied from the buffer 222 to the reproduction section 230. Note that, in FIGS. 8 to 10, numbers (e.g., 2 to 17) are assigned to data blocks of the normal reproduction streaming data. The normal reproduction streaming data has been divided into the data blocks, each of which has a predetermined unit size.

Also note that, as shown in FIG. 8, the buffer 222 may be a ring buffer, for example. The buffer 222 may include a read point ("read") and a write point ("write"). In some embodiments, data to be recorded onto the buffer 222 is recorded on a region that follows the write point (i.e., a region to the left of the write point in FIG. 8), whereas data recorded on a region that follows the read point (i.e., a region to the left of the read point in FIG. 8) is supplied to the reproduction section 230. Therefore, in some embodiments, data block 16, which has been transmitted from the content providing server 10, will be recorded on a location in the buffer 222 at which data block 2 is currently recorded, and data block 17 will be recorded on a location in the buffer 222 at which data block 3 is currently recorded.

Figure 9:
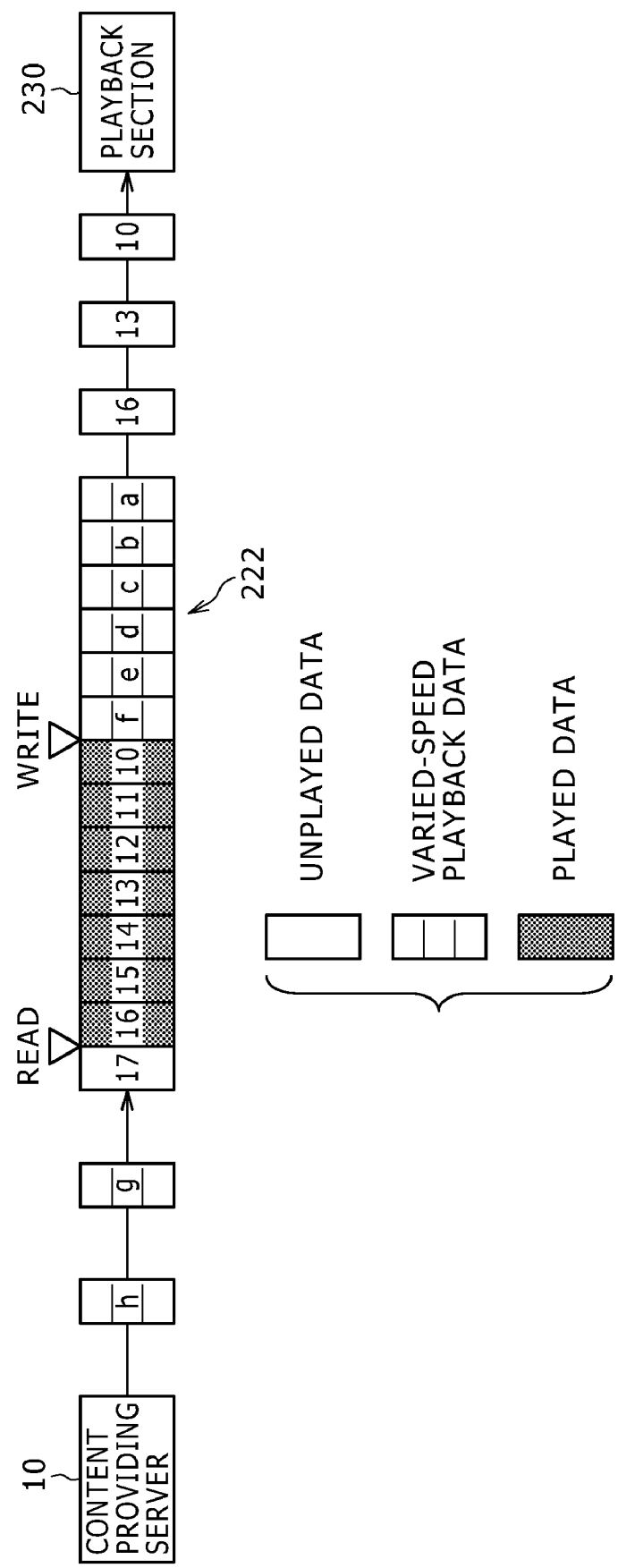
FIG. 9 is a diagram illustrating how transitional reproduction of the content may be performed.
Figure 10:
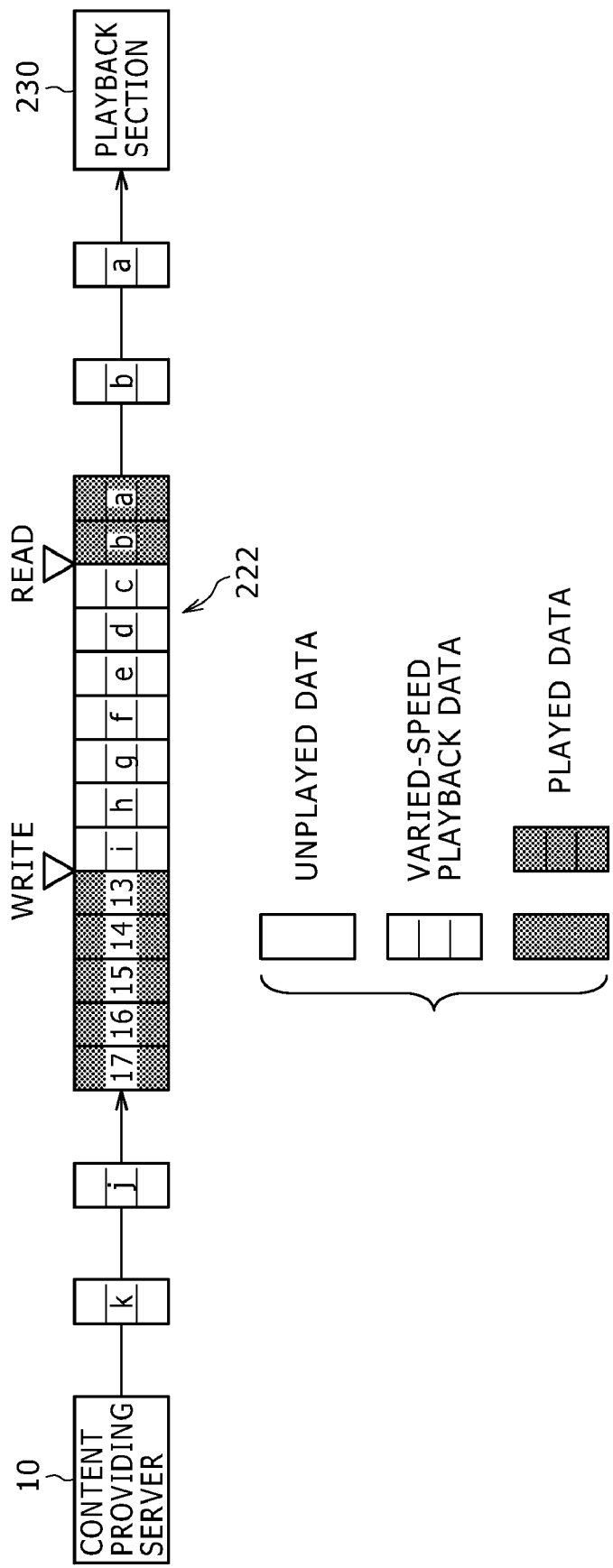
FIG. 10 is a diagram illustrating how varied-speed reproduction of the content may be performed.

Note that, in FIGS. 8 to 10, played data blocks (i.e., data blocks that have been outputted from the buffer 222) are shaded. That is, in FIG. 8, data blocks 2 to 7 have already been played, whereas data blocks 8 to 15 have not been played yet. If the request for the varied-speed reproduction of the content is made when the normal reproduction of the content is being performed as illustrated in FIG. 8, the content reproduction apparatus 20, under control of the control section 260, may shift to a transitional reproduction as illustrated in FIG. 9.

FIG. 9 is a diagram illustrating how the transitional reproduction of the content may be performed. As illustrated in FIG. 9, if the request for the varied-speed reproduction of the content is made, the content reproduction apparatus 10 may stop acquisition of the normal reproduction streaming data and may thereafter start acquisition of the varied-speed reproduction streaming data. Note that, in exemplary FIGS. 9 and 10, alphabets are assigned to data blocks of the varied-speed reproduction streaming data. The varied-speed reproduction streaming data has been divided into the data blocks in this example, each of which has a predetermined unit size.

In addition, if the request for the varied-speed reproduction of the content is made, the reproduction control section 262 may supply un-played streaming data recorded on the buffer 222 selectively to the reproduction section 230 to allow the reproduction section 230 to play the content at the transition speed. FIG. 9 illustrates an exemplary case in which every three data blocks are supplied to the reproduction section 230. Details of how such data blocks are supplied to the reproduction section 230 and a manner in which the reproduction section 230 plays the content at the transition speed will be described later.

If the data amount of the varied-speed reproduction streaming data buffered in the buffer 222 has become sufficient to start playing the varied-speed reproduction streaming data (this state will be hereinafter referred to as a "reproduction preparation complete state"), the content reproduction apparatus 20 may shift to the varied-speed reproduction as illustrated in FIG. 10. Note that the reproduction preparation complete state may be a state in which the data amount of the streaming data buffered in the buffer 222 has reached the data amount that does not cause either the overflow or the underflow. Specifically, in some embodiments, the reproduction preparation complete state may be a state in which the data amount of the varied-speed reproduction streaming data buffered in the buffer 222 has reached half the data amount corresponding to the storage capacity of the buffer 222.

FIG. 10 is an exemplary diagram illustrating how the varied-speed reproduction of the content is performed. As illustrated in FIG. 10, if the buffer 222 has reached the reproduction preparation complete state, the reproduction control section 262 may allow the varied-speed reproduction streaming data to be supplied from the buffer 222 to the reproduction section 230. Then, the reproduction section 230 may be capable of performing the varied-speed reproduction of the content based on the varied-speed reproduction streaming data.

Note that, if the buffer 222 has reached the reproduction preparation complete state (i.e., the state in which the preparation for the varied-speed reproduction has been completed), the streaming processing section 220 may delete the normal reproduction streaming data buffered in the buffer 222.

As described above, if the request for the varied-speed reproduction of the content is made, the content reproduction apparatus 20 may immediately shift to the transitional reproduction to play the content at the transition speed based on the normal reproduction streaming data. This enhances convenience for the user. Next, a method of playing the content at the aforementioned transition speed at the time of the transitional reproduction will now be described below.

Exemplary Method of Achieving Transitional Reproduction

Here, a method of playing the content at N times the normal speed based on the normal reproduction streaming data will be described first, and thereafter, a method of determining the value of N will be described.

Assume that quantity a of I images (or pictures) are displayed per second. In some embodiments, a Group of Pictures (GOP) includes a single image I. Then, in order to allow the reproduction section 230 to play the content at N times the normal speed based on the normal reproduction streaming data, quantity a of GOPs need to be extracted from N seconds of the normal reproduction streaming data and supplied to the reproduction section 230 per second. That is, if the reproduction section 230 plays the content at N times the normal speed using the normal reproduction streaming data, then the normal reproduction streaming data actually used is extracted from the normal reproduction streaming data. The normal reproduction streaming data would be N times the data size of the normal reproduction streaming data actually used.

If the duration of a GOP is 0.5 seconds, the streaming processing section 220 supplies every 2·N/a GOPs to the reproduction section 230. Moreover, if reproduction section 230 plays video of 30 frames per second, each image I would be played for a period of time corresponding to 30/a frames before the next image I is played. This would distribute the quantity a of images I over the number of frames displayed in a second.

For example, suppose that the reproduction section 230 is allowed to play the content at 30 times the normal speed and play five images I per second. In this case, the streaming processing section 220 would supply every twelve GOPs to the reproduction section 230, (2·30/5) and the reproduction section 230 would play the image I in each of the supplied GOPs for a period of time corresponding to six frames (30/5).

The streaming processing section 220 may supply, as virtual GOPs, data blocks whose boundaries do not coincide with those of the actual GOPs, to the reproduction section 230. The reproduction section 230 is capable of extracting the image I from the data block as the virtual GOP, and playing the extracted image I. An exemplary method of obtaining the data blocks as the virtual GOPs will now be described below.

If the varied-speed reproduction request has been inputted, the streaming processing section 220 may first extract time stamps in the first and last TS packets in the un-played normal reproduction streaming data. Then, based on a difference between the two extracted time stamps, the streaming processing section 220 may calculate a playing time b of the un-played normal reproduction streaming data if it were played at the normal speed. It is assumed here that the data amount of the un-played normal reproduction streaming data buffered in the buffer 222 is c.

If the duration of a GOP is 0.5 seconds, the streaming processing section 220 divides the un-played normal reproduction streaming data into b/0.5 parts. The data blocks obtained by dividing the un-played normal reproduction streaming data in the above manner are the virtual GOPs. While the boundaries of the virtual GOPs do not coincide with those of the actual GOPs, each of the virtual GOPs is expected to include the image I. Each data block as the virtual GOP has a data amount of c/(b/0.5).

Therefore, if directing the reproduction section 230 to play the content at N times the normal speed, the streaming processing section 220 may supply every 2·N/a data blocks as the virtual GOPs to the reproduction section 230. Then, the reproduction section 230 may extract the image I from each of the supplied data blocks as the virtual GOPs, and plays each extracted image I for a period of time corresponding to a frames.

The value of N (N times the normal speed is the speed at which the content is played at the time of the transitional reproduction) may be specified by the reproduction control section 262 for the streaming processing section 220. Also, the value of "a" may be specified by the reproduction control section 262 for the reproduction section 230.

Moreover, N times the normal speed may correspond to the speed of the varied-speed reproduction as requested by the user. Also, the value of N may be a fixed value. Alternatively, the value of N may be dynamically determined based on a period of time between the input of the request for the varied-speed reproduction from the user and when the buffer 222 reaches the reproduction preparation complete state. A method of determining the value of N dynamically will now be described below.

First, the reproduction control section 262 may estimate a period t of time between the input of the request for the varied-speed reproduction from the user and when the buffer 222 will reach the reproduction preparation complete state. The reproduction control section 262 may hold, as the period t of time, a period of time between previous input of the request for the varied-speed reproduction from the user and when the buffer 222 reached the reproduction preparation complete state, for example.

On the assumption that the playing time of the un-played normal reproduction streaming data buffered in the buffer 222 is b if it were played at the normal speed, the reproduction control section 262 is capable of determining the value of N based on an equation, N=b/t, as a third speed.

In this case, immediately before the buffer 222 reaches the reproduction preparation complete state, the reproduction section 230 may be playing the content based on a last portion of the normal reproduction streaming data buffered in the buffer 222. In addition, in the case in which the content reproduction apparatus 20 starts the acquisition of the varied-speed reproduction streaming data with a location corresponding to a location at which the content reproduction apparatus 20 has stopped the acquisition of the normal reproduction streaming data, the reproduction section 230 is capable of shifting from the transitional reproduction of the content to the varied-speed reproduction of the content while maintaining continuity of the content.

In the case in which N times the normal speed, the value of N being determined based on the equation, N=b/t (i.e. the third speed), is higher than the speed (i.e., the specified speed) of the varied-speed reproduction as specified by the user, the reproduction control section 262 may allow the reproduction section 230 to play the content at the specified speed at the time of the transitional reproduction.

In this case, the reproduction section 230 may be capable of starting the reproduction of the content at the speed of the varied-speed reproduction as specified by the user immediately after receiving the varied-speed reproduction request. This enhances convenience for the user. Moreover, the specified speed may be lower than N times the normal speed. Note here that if played at N times the normal speed, the normal reproduction streaming data recorded on the buffer 222 can be entirely played by the time at which the buffer 222 is expected to reach the reproduction preparation complete state. Therefore, if the reproduction section 230 plays the content at the specified speed based on the normal reproduction streaming data recorded on the buffer 222 in response to the varied-speed reproduction request, it is expected that this reproduction will continue until the buffer 22 reaches the reproduction preparation complete state. Therefore, the reproduction section 230 is capable of shifting from the reproduction of the content based on the normal reproduction streaming data to the varied-speed reproduction of the content based on the varied-speed reproduction streaming data while ensuring continuity, without stopping the reproduction of the content.

Still further, in the case in which the specified speed is lower than N times the normal speed, the acquisition control section 264 may estimate a location in the content at which the reproduction section 230 will be playing the content at the specified speed when the buffer 222 reaches the reproduction preparation complete state. In addition, the acquisition control section 264 may direct the communication section 216 to start the acquisition of the varied-speed reproduction streaming data with a location corresponding to the estimated location in the content. Specifically, the acquisition control section 264 may specify a location with which the communication section 216 should start the acquisition of the varied-speed reproduction streaming data based on the time stamp in the TS packet or the PTS information.

In this case, the reproduction section 230 is capable of shifting from the reproduction of the content based on the normal reproduction streaming data to the reproduction of the content at the specified speed based on the varied-speed reproduction streaming data while ensuring the continuity of the content reproduction and the continuity of the content.

The varied-speed reproduction streaming data may be streaming data composed of only images I. In this case, the reproduction preparation complete state may refer to a state in which the streaming data composed of only images I has arrived at the content reproduction apparatus 20.

[3-3] Flow of Operation of Content Reproduction Apparatus

The structure of the content reproduction apparatus 20 has been described above. Next, a content reproduction method that may be performed by the content reproduction system 1 will now be described below with reference to FIG. 11.

Figure 11:
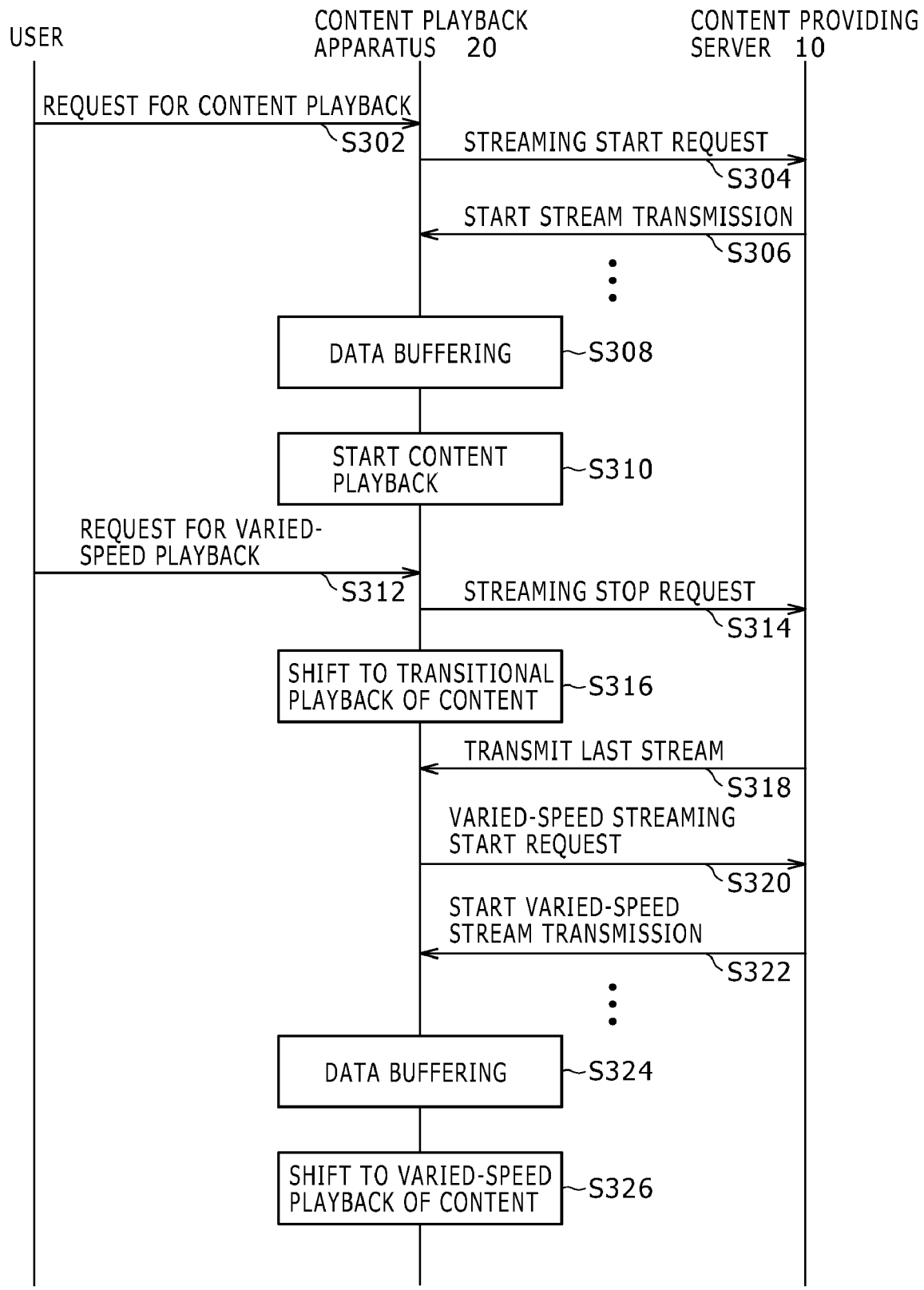
FIG. 11 is a sequence diagram showing a flow of a content reproduction method performed by the content reproduction system according to disclosed embodiments.

FIG. 11 is a sequence diagram showing a flow of the content reproduction method that may be performed by the content reproduction system 1. First, if the request for the content reproduction is inputted from the user by using the remote controller, for example (S302), the content reproduction apparatus 20 may request the content providing server 10 to start the transmission of the normal reproduction streaming data of the content (i.e., makes the streaming start request) (S304).

In response to the streaming start request from the content reproduction apparatus 20, the content providing server 10 may start the transmission of the normal reproduction streaming data of the content to the content reproduction apparatus 20 (S306). Then, the content reproduction apparatus 20 may buffer the normal reproduction streaming data transmitted from the content providing server 10 (S308).

If the data amount of the buffered normal reproduction streaming data has become sufficient to start the reproduction of the content, the content reproduction apparatus 20 may start the normal reproduction of the content based on the buffered streaming data (S310).

Then, if the request for the varied-speed reproduction of the content is inputted from the user (S312), the content reproduction apparatus 20 may request the content providing server 10 to stop the transmission of the normal reproduction streaming data (S314). Further, the content reproduction apparatus 20 may shift to the transitional reproduction to play the content at the transition speed based on the un-played normal reproduction streaming data recorded on the buffer 222 (S316). The processes of S314 and S316 may be reversed in order or performed at the same time.

Thereafter, if the last normal reproduction streaming data that has been transmitted from the content providing server 10 arrives at the content reproduction apparatus 20 (S318), the content reproduction apparatus 20 may request the content providing server 10 to start the transmission of the varied-speed reproduction streaming data (S320). In response to the request from the content reproduction apparatus 20, the content providing server 10 may start the transmission of the varied-speed reproduction streaming data (S322).

The content reproduction apparatus 20 buffers the varied-speed reproduction streaming data transmitted from the content providing server 10 in the buffer 222 (S324). Then, if the data amount of the varied-speed reproduction streaming data buffered in the buffer 222 becomes sufficient to start the varied-speed reproduction (i.e., if the reproduction preparation complete state is reached), the content reproduction apparatus 20 may start the varied-speed reproduction of the content based on the varied-speed reproduction streaming data (S326).

[3-4] Another Exemplary Operation of Content Reproduction Apparatus

The case in which the content reproduction apparatus 20 shifts from the normal reproduction of the content to the varied-speed reproduction of the content in a normal direction has been described above. Next, the case in which the content reproduction apparatus 20 shifts from the normal reproduction of the content to the varied-speed reproduction of the content in a reverse direction will now be described below with reference to FIGS. 12, 13, and 14.

FIG. 12 is a diagram illustrating how the normal reproduction of the content may be performed. Note that, in FIGS. 12 to 14, only the buffer 222 and the reproduction section 230 are shown of all the components of the content reproduction apparatus 20, while the other components thereof are omitted.

As illustrated in FIG. 12, at the time of the normal reproduction of the content, the normal reproduction streaming data may be transmitted from the content providing server 10, and the normal reproduction streaming data (i.e., the first streaming data) may be supplied from the buffer 222 to the reproduction section 230. Note that, in exemplary FIGS. 12 to 14, numbers (e.g., 2 to 17) are assigned to the data blocks of the normal reproduction streaming data. The normal reproduction streaming data has been divided into the data blocks in some embodiments, each of which has the predetermined unit size.

As illustrated in FIG. 12, the buffer 222 may be the ring buffer, for example. The buffer 222 may include the read point (read) and the write point (write). The data to be recorded onto the buffer 222 may be recorded on the region that follows the write point (i.e., the region to the left of the write point in FIG. 12), whereas the data recorded on the region that follows the read point (i.e., the region to the left of the read point in FIG. 12) may be supplied to the reproduction section 230.

Therefore, if the normal reproduction is allowed to continue, data block 16, which has been transmitted from the content providing server 10, may be recorded on a location in the buffer 222 at which data block 1 is currently recorded, and data block 17 may be recorded on a location in the buffer 222 at which data block 2 is currently recorded.

However, if a request is made for the varied-speed reproduction of the content in the reverse direction while the normal reproduction of the content is performed as illustrated in FIG. 12, the content reproduction apparatus 20, under control of the control section 260, may shift to transitional reproduction as illustrated in FIG. 13.

Specifically, in some embodiments, data blocks 16 and 17, which have been transmitted from the content providing server 10 at the time of the normal reproduction, are discarded, and the read point and the write point start to move in the reverse direction. Further, as illustrated in FIG. 13, if the request has been made for the varied-speed reproduction of the content in the reverse direction, the content reproduction apparatus 20 may stop the acquisition of the normal reproduction streaming data and may thereafter start acquisition of streaming data specialized for the varied-speed reproduction in the reverse direction (hereinafter referred to as "reverse varied-speed reproduction streaming data"). Note that, in FIGS. 13 and 14, alphabets are assigned to data blocks of the reverse varied-speed reproduction streaming data. The reverse varied-speed reproduction streaming data has been divided into the data blocks, each of which has a predetermined unit size.

Further, if the request has been made for the varied-speed reproduction of the content in the reverse direction, the reproduction control section 262 may supply the played normal reproduction streaming data recorded on the buffer 222 selectively to the reproduction section 230 to allow the reproduction section 230 to play the content at the transition speed. FIG. 13 illustrates an exemplary case in which every three data blocks are supplied to the reproduction section 230 in the reverse direction. A manner in which the data blocks are supplied to the reproduction section 230 at this time and a manner in which the reproduction section 230 plays the content at the transition speed may be significantly the same as those in the case of the varied-speed reproduction in the normal direction.

Then, if the data amount of the reverse varied-speed reproduction streaming data buffered in the buffer 222 has become sufficient to start the varied-speed reproduction of the content in the reverse direction (i.e., if the reproduction preparation complete state is reached), the content reproduction apparatus 20 may shift to the varied-speed reproduction of the content in the reverse direction as illustrated in FIG. 14. Note that the reproduction preparation complete state may be a state in which the data amount of the reverse varied-speed reproduction streaming data buffered in the buffer 222 has reached the data amount that does not cause either the overflow or the underflow. Specifically, the reproduction preparation complete state may be a state in which the data amount of the reverse varied-speed reproduction streaming data buffered in the buffer 222 has reached half the data amount corresponding to the storage capacity of the buffer 222.

FIG. 14 illustrates how the varied-speed reproduction of the content in the reverse direction is performed. As illustrated in FIG. 14, if the buffer 222 has reached the reproduction preparation complete state, the reproduction control section 262 may allow the reverse varied-speed reproduction streaming data to be supplied from the buffer 222 to the reproduction section 230. Then, the reproduction section 230 is capable of performing the varied-speed reproduction of the content in the reverse direction, based on the reverse varied-speed reproduction streaming data.

If the buffer 222 has reached the reproduction preparation complete state (i.e., the state in which the preparation for the varied-speed reproduction has been completed), the streaming processing section 220 may delete the normal reproduction streaming data buffered in the buffer 222.

As described above, if the request for the varied-speed reproduction of the content in the reverse direction is made, the content reproduction apparatus 20 may immediately shift to the transitional reproduction to play the content in the reverse direction at the transition speed based on the normal reproduction streaming data. This enhances convenience for the user. Moreover, if the request for the varied-speed reproduction of the content in the reverse direction is made, the content reproduction apparatus 20 may discard the normal reproduction streaming data that has been received thereafter. This prevents deletion of the normal reproduction streaming data recorded on the buffer 222, which will be used for playing the content in the reverse direction.

[4] Summary

As described above, in the content reproduction apparatus 20, the communication section 216 may start the acquisition of the varied-speed reproduction streaming data from the content providing server 10 in response to the request for the varied-speed reproduction of the content. Then, the acquisition of the varied-speed reproduction streaming data may continue for a certain period of time, so that the reproduction preparation complete state is reached. In addition, in response to the request for the varied-speed reproduction of the content, the reproduction control section 262 may direct the reproduction section 230 to play the content at the transition speed based on the normal reproduction streaming data recorded on the buffer 222. Further, if the acquisition of the varied-speed reproduction streaming data has progressed so far that the reproduction preparation complete state is reached, the reproduction control section 262 may direct the reproduction section 230 to perform the varied-speed reproduction of the content based on the varied-speed reproduction streaming data recorded on the buffer 222. Therefore, according to the content reproduction apparatus 20, if the request for the varied-speed reproduction of the content is made while the normal reproduction of the content is performed, it may be possible to quickly shift from the content reproduction at the normal speed to the content reproduction at the transition speed using the normal reproduction streaming data recorded on the buffer 222.

While the preferred embodiment of the present invention has been described above with reference to the accompanying drawings, one or ordinary skill in the art would recognize that disclosed embodiments are not limited in this respect. It should be understood by those skilled in the art that various modifications, combinations, sub-combinations and alterations may occur depending on design requirements and other factors insofar as they are within the scope of the appended claims or the equivalents thereof.

For example, in the above description, the case has been described in which the varied-speed reproduction is reproduction at a higher speed than the normal speed. However, disclosed embodiments are not limited to this case. The user may make a request for varied-speed reproduction of the content at a lower speed than the normal speed, for example. In this case, the content reproduction apparatus 20 may be capable of immediately starting reproduction of the content at a lower speed than the normal speed, based on the normal reproduction streaming data recorded on the buffer 222.

Further, even if the user has made a request to shift from the varied-speed reproduction to the normal reproduction, the content reproduction apparatus 20 may be capable of performing a similar process. For example, if the request has been made to shift from the varied-speed reproduction to the normal reproduction, the content reproduction apparatus 20 may perform the normal reproduction of the content based on the varied-speed reproduction streaming data recorded on the buffer 222.

Note that the steps in the processing by the content reproduction system 1 as described above do not need to be performed chronologically in the order as indicated in the above-described sequence diagrams. For example, some of the steps in the processing by the content reproduction system 1 may be performed in parallel or independently of one another. For example, some of the steps may be implemented by parallel processing or object processing.

Also note that it is also possible to create a computer program that causes hardware such as the CPU 201, the ROM 202, and the RAM 203 contained in the content reproduction apparatus 20 to perform functions similar to those of the components of the above-described content reproduction apparatus 20. Also note that it is also possible to provide a storage medium storing such a computer program. Also note that the functional blocks as shown in the functional block diagram of FIG. 7 can also be implemented in hardware to realize the above-described series of processes by the hardware.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A content reproduction apparatus, comprising:
    a storage medium;
    a data acquisition section configured to acquire, from a data transmission apparatus, first streaming data that is used to play a content at a first speed;
    a recording section configured to record the first streaming data on the storage medium;
    a reproduction section configured to play the content at the first speed, based on the stored first streaming data;
    an acquisition control section configured to direct the data acquisition section to start acquiring second streaming data in response to a varied-speed reproduction request for the content, wherein the second streaming data is specialized data to play the content at a second speed associated with the varied-speed reproduction request; and
    a reproduction control section configured to:
        direct the reproduction section to play the content at a transition speed based on the stored first streaming data, in response to the varied-speed reproduction request,
        direct the reproduction section to play the content at the second speed based on the second streaming data, after acquisition of the second streaming data by the data acquisition section progresses to a reproduction preparation complete state,
        calculate a third speed when the varied-speed reproduction request is inputted, wherein the third speed allows the stored first streaming data to be played until a time at which the reproduction preparation complete state is expected to be reached, and
        use the third speed as the transition speed.

2. The content reproduction apparatus according to claim 1, wherein the reproduction control section is further configured to:
    calculate a third speed when the varied-speed reproduction request is inputted, wherein the third speed allows the stored first streaming data to be played by a time at which the reproduction preparation complete state is expected to be reached, and
    use the second speed as the transition speed if the second speed is lower than the third speed.

3. The content reproduction apparatus according to claim 2, wherein the reproduction control section uses the second speed as the transition speed, and wherein the acquisition control section is further configured to:
    estimate a location in the content at which the reproduction preparation complete state will be reached, when the reproduction section plays the content based on the first streaming data; and
    direct the data acquisition section to start acquisition of the second streaming data at a location, in the content, that corresponds to the estimated location.

4. The content reproduction apparatus according to claim 1, wherein:
    the storage medium comprises a ring buffer, and
    the recording section does not record, to the storage medium, the first streaming data acquired after the varied-speed reproduction request has been inputted, if the varied-speed reproduction request is for a reverse direction.

5. A content reproduction method, comprising the steps of:
    acquiring, from a data transmission apparatus, first streaming data that is used to play a content at a first speed;
    recording the first streaming data on a storage medium;
    playing the content at the first speed, based on the stored first streaming data;
    starting acquisition of second streaming data in response to a varied-speed reproduction request for the content, wherein the second streaming data is specialized data to play the content at a second speed associated with the varied-speed reproduction request;
    playing the content at a transition speed based on the stored first streaming data, in response to the varied-speed reproduction request;
    playing the content at the second speed based on the second streaming data, after the acquisition of the second streaming data progresses to a reproduction preparation complete state;
    calculating a third speed when the varied-speed reproduction request is inputted, wherein the third speed allows the stored first streaming data to be played until a time at which the reproduction preparation complete state is expected to be reached; and
    using the third speed as the transition speed.

6. The content reproduction method according to claim 5, further comprising:
    using the second speed as the transition speed if the second speed is lower than the third speed.

7. The content reproduction method according to claim 6, further comprising:
    using the second speed as the transition speed;
    estimating a location in the content at which the reproduction preparation complete state will be reached, when the content based on the first streaming data is played; and
    starting acquisition of the second streaming data with a location, in the content, that corresponds to the estimated location.

8. The content reproduction method according to claim 5, wherein the storage medium comprises a ring buffer, the method further comprising:
    receiving, without storing in the storage medium, the first streaming data acquired after the varied-speed reproduction request has been inputted, if the varied-speed reproduction request is for a reverse direction.

9. A non-transitory computer-readable medium storing a program, which, when executed by a processor, causes the processor to perform a content reproduction method, the method comprising:
    acquiring, from a data transmission apparatus, first streaming data that is used to play a content at a first speed;
    recording the first streaming data on a storage medium;
    playing the content at the first speed, based on the stored first streaming data;
    starting acquisition of second streaming data in response to a varied-speed reproduction request for the content, wherein the second streaming data is specialized data to play the content at a second speed associated with the varied-speed reproduction request;
    playing the content at a transition speed based on the stored first streaming data, in response to the varied-speed reproduction request;
    playing the content at the second speed based on the second streaming data, after the acquisition of the second streaming data progresses to a reproduction preparation complete state;
    calculating a third speed when the varied-speed reproduction request is inputted, wherein the third speed allows the stored first streaming data to be played until a time at which the reproduction preparation complete state is expected to be reached; and using the third speed as the transition speed.

10. A content reproduction system, comprising:

a data transmission apparatus configured to transmit streaming data of a content; and a content reproduction apparatus configured to play the content based on the streaming data transmitted from the data transmission apparatus, the content reproduction apparatus comprising:

a data acquisition section configured to acquire, from the data transmission apparatus, first streaming data that is used to play a content at a first speed;

a recording section configured to record the first streaming data on a storage medium;

a reproduction section configured to play the content at the first speed, based on the stored first streaming data;

an acquisition control section configured to direct the data acquisition section to start acquiring second streaming data in response to a varied-speed reproduction request for the content, wherein the second streaming data is specialized data to play the content at a second speed associated with the varied-speed reproduction request; and a reproduction control section configured to:

direct the reproduction section to play the content at a transition speed based on the stored first streaming data, in response to the varied-speed reproduction request;

direct the reproduction section to play the content at the second speed based on the second streaming data, after acquisition of the second streaming data by the data acquisition section progresses to a reproduction preparation complete state;

calculate a third speed when the varied-speed reproduction request is inputted, wherein the third speed allows the stored first streaming data to be played until a time at which the reproduction preparation complete state is expected to be reached, and use the third speed as the transition speed.

* * * * *